US010430801B2

(12) United States Patent
Engles et al.

(10) Patent No.: US 10,430,801 B2
(45) Date of Patent: Oct. 1, 2019

(54) GENERATING AND PROVIDING A SELF-SERVICE DEMONSTRATION TO FACILITATE PERFORMANCE OF A SELF-SERVICE TASK

(71) Applicant: Accenture Global Services Limited, Dublin (IE)

(72) Inventors: Edward R. Engles, Washington, DC (US); David Klimek, North Bethesda, MD (US)

(73) Assignee: Accenture Global Services Limited, Dublin (IE)

( * ) Notice: Subject to any disclaimer, the term of this patent is extended or adjusted under 35 U.S.C. 154(b) by 653 days.

(21) Appl. No.: 14/692,831

(22) Filed: Apr. 22, 2015

(65) Prior Publication Data
US 2016/0314473 A1    Oct. 27, 2016

(51) Int. Cl.
*G06Q 10/00*   (2012.01)
*G06Q 30/00*   (2012.01)

(52) U.S. Cl.
CPC .......... *G06Q 30/016* (2013.01); *G06Q 10/00* (2013.01)

(58) Field of Classification Search
None
See application file for complete search history.

(56) References Cited

U.S. PATENT DOCUMENTS 5,597,312 A * 1/1997 Bloom ............... G09B 7/04
434/118
5,974,446 A * 10/1999 Sonnenreich ....... H04L 12/1822
709/203

6,513,031 B1   1/2003 Fries et al.
7,640,548 B1 * 12/2009 Yu ..................... G06Q 10/10
718/106

(Continued)

FOREIGN PATENT DOCUMENTS

WO   2001/075555 A2   10/2001
WO   2013/155619 A1   10/2013

OTHER PUBLICATIONS

Employee Self-Service Quick Reference Card, 2014, ADP, https://support.adp.com/netsecure/.../ADP_Employee_Self_Service_Registration.docx, p. 1-18.*

(Continued)

*Primary Examiner* — Joseph M Waesco
(74) *Attorney, Agent, or Firm* — Harrity & Harrity, LLP

(57) ABSTRACT

A device may obtain a user identifier associated with a user. The device may identify a self-service task to be performed by the user using a user device. The self-service task may be a task that does not require the user to interact with another person. The device may obtain account information, specific to the user, based on the user identifier and the self-service task. The device may generate a self-service demonstration that includes instructions for performing the self-service task, media content for communicating the instructions, and the account information specific to the user. The device may provide the self-service demonstration for presentation to the user. The device may receive an indication of an interaction, by the user, with the self-service demonstration. The interaction may include user input, and the device may modify the account information based on the user input.

20 Claims, 40 Drawing Sheets

(56) References Cited

U.S. PATENT DOCUMENTS

| | | | | |
|---|---|---|---|---|
| 7,673,340 | B1* | 3/2010 | Cohen | G06F 11/3438 379/266.08 |
| 7,881,963 | B2* | 2/2011 | Chudnovsky | G06Q 30/02 705/14.16 |
| 7,890,336 | B2 | 2/2011 | Birnbaum et al. | |
| 8,630,990 | B2* | 1/2014 | Gowel | G09B 7/00 707/705 |
| 8,832,117 | B2* | 9/2014 | Su | G06N 5/043 707/748 |
| 9,203,826 | B1* | 12/2015 | Margolis | H04L 63/08 |
| 9,349,298 | B2* | 5/2016 | Okamoto | G09B 5/06 |
| 9,652,590 | B2* | 5/2017 | Yeager | G16H 40/40 |
| 9,665,234 | B2* | 5/2017 | Lafreniere | G06F 3/0481 |
| 9,697,486 | B2* | 7/2017 | Cohen | G06Q 10/00 |
| 2002/0103882 | A1* | 8/2002 | Johnston | G09B 7/00 709/218 |
| 2003/0023435 | A1* | 1/2003 | Josephson | G10L 15/26 704/235 |
| 2007/0269782 | A1* | 11/2007 | Puente | G09B 5/00 434/219 |
| 2009/0112652 | A1* | 4/2009 | Kelsey | G06Q 10/06 705/7.13 |
| 2010/0185566 | A1* | 7/2010 | Schott | G06N 5/043 706/10 |
| 2011/0161802 | A1* | 6/2011 | Jia | G06F 17/24 715/235 |
| 2011/0173225 | A1* | 7/2011 | Stahl | G06Q 30/04 707/769 |
| 2011/0306026 | A1* | 12/2011 | Scholler | G09B 5/00 434/317 |
| 2011/0306030 | A1* | 12/2011 | Scholler | G09B 5/06 434/362 |
| 2011/0307779 | A1* | 12/2011 | Scholler | G06F 21/6218 715/705 |
| 2011/0314375 | A1* | 12/2011 | Zaika | G06F 3/0482 715/708 |
| 2012/0064499 | A1* | 3/2012 | Samuelson | G09B 7/00 434/309 |
| 2012/0192077 | A1* | 7/2012 | Castellani | G03G 15/5079 715/740 |
| 2013/0031208 | A1* | 1/2013 | Linton | G09B 7/02 709/217 |
| 2013/0204881 | A1* | 8/2013 | Su | G06N 5/043 707/749 |
| 2014/0270399 | A1* | 9/2014 | Johnston | G06F 21/32 382/115 |
| 2014/0280296 | A1* | 9/2014 | Johnston | G06K 9/00302 707/769 |
| 2014/0310596 | A1* | 10/2014 | Lafreniere | G06F 3/0481 715/708 |
| 2015/0095143 | A1* | 4/2015 | Jin | G06Q 30/0251 705/14.49 |
| 2015/0310488 | A1* | 10/2015 | Hess | G06F 16/245 705/14.55 |
| 2015/0379221 | A1* | 12/2015 | Yeager | G16H 40/40 715/771 |

OTHER PUBLICATIONS

Extended European Search Report corresponding to EP Application No. 16166126.9, dated Jul. 7, 2016, 9 pages.

SundaySky, "SmartVideo," www.sundaysky.com, Apr. 10, 2014, 2 pages.

* cited by examiner

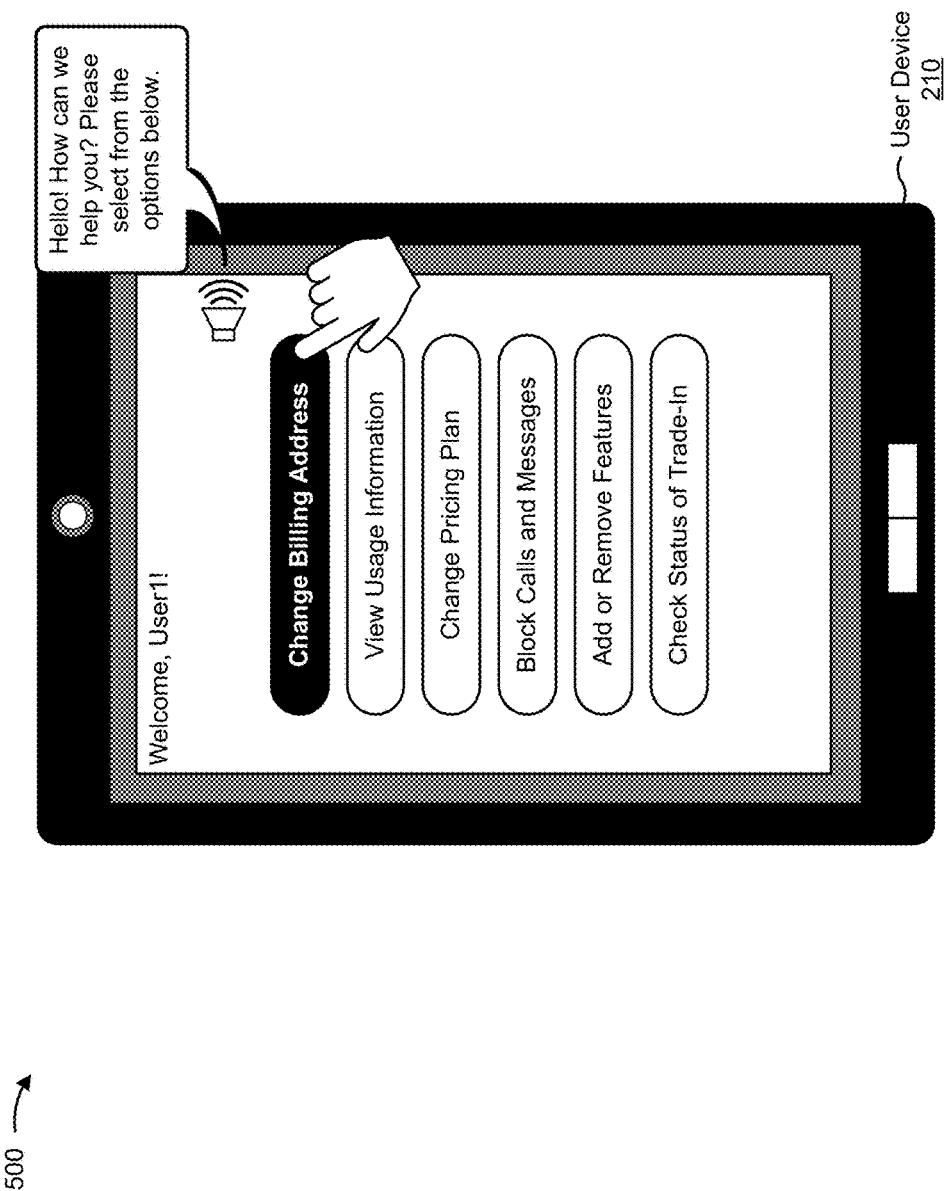

| Self-Service Task | User Account Info |
|---|---|
| 505 | |
| 510 — Change Billing Address | Billing Address |
| 515 — View Usage Information | Billing Cycle |
| | Mobile Service Plan |
| | Data Usage |
| | Minutes Usage |
| | Messages Usage |
| 520 — Change Pricing Plan | Mobile Service Plan |
| | Available Service Plans |
| | Service Plan Promotions |
| | User(s) Device Type |
| | Data Usage |
| | Minutes Usage |
| | Messages Usage |
| | Billing Cycle |
| | User Payment Info |
| 525 — Block Calls and Messages | Mobile Service Plan |
| | User(s) Device Type |
| | Blocked Numbers |
| 530 — Add or Remove Features | User(s) Device Type |
| | Mobile Service Plan |
| | User(s) Features |
| | Available Products |
| | Product Promotions |
| | Available Applications |
| | User Payment Info |
| 535 — Check Status of Trade-In | User(s) Device Type |
| | Phone Number |

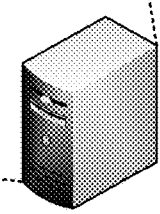

Server Device
220

| User(s) associated with account | User Account Info | |
|---|---|---|
| User1 (123) 456-7890 | Billing Address | 321 Example Drive, Exampletown, VA 54321 (123) 456-7890, (111) 222-3333 |
| | Billing Cycle | Payment date: 15th of every month |
| | Mobile Service Plan | Unlimited Plan |
| | Data Usage | 0 |
| | Minutes Usage | 0 |
| | Messages Usage | 0 |
| | User(s) Device Type | Example Phone 4 |
| | Blocked Numbers | None |
| | Available Service Plans | Unlimited Plan, Plan 1, Plan 2 |
| | Service Plan Promotions | Plan 1 $100.00 /mo  Unlimited Plan 50% off Example Phone 5 |
| | User Payment Info | Credit Card No.: 123456781, Exp.: 1/2060, Sec. Code: 123 |
| | User(s) Features | N/A |
| | Available Products | Example Phone 3, Example Phone 4, Example Phone 5 |
| | Product Promotions | Unlimited Plan 50% off Example Phone 5 |
| | Available Applications | Ring Tone 1, Ring Tone 2, Ring Tone 3 |

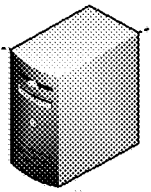

Server Device
220

FIG. 5D

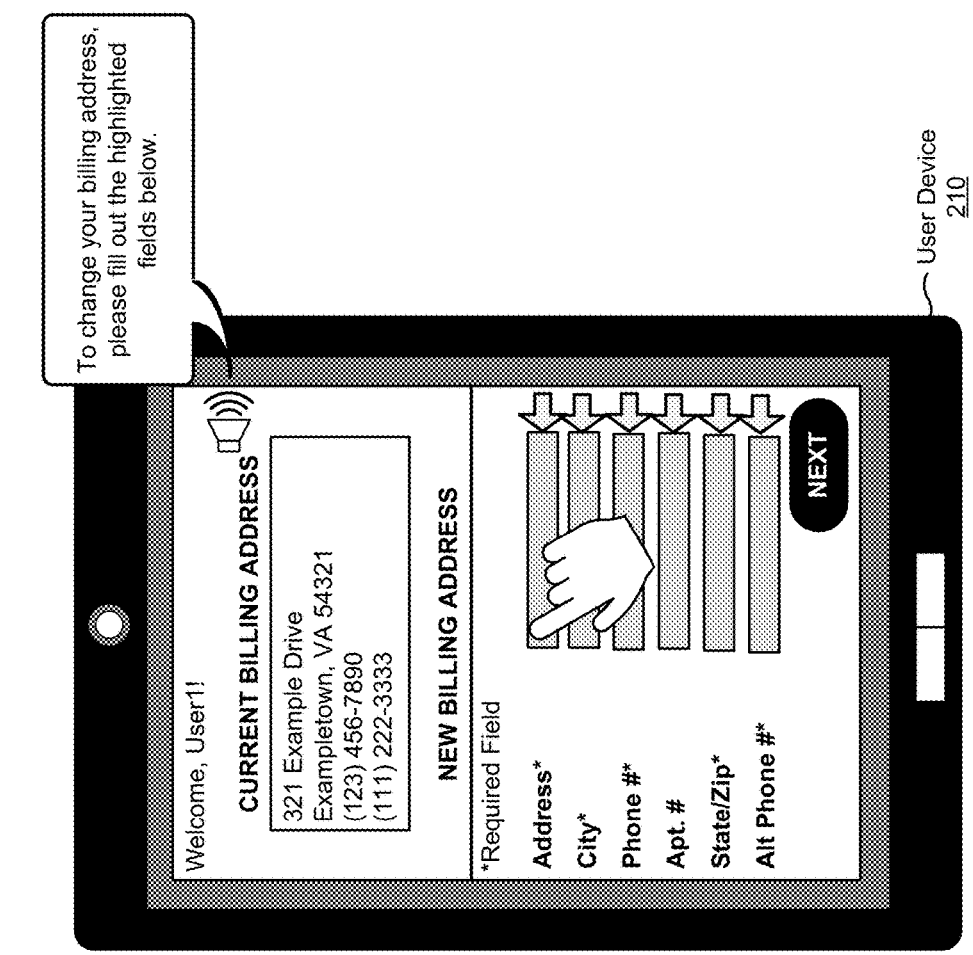

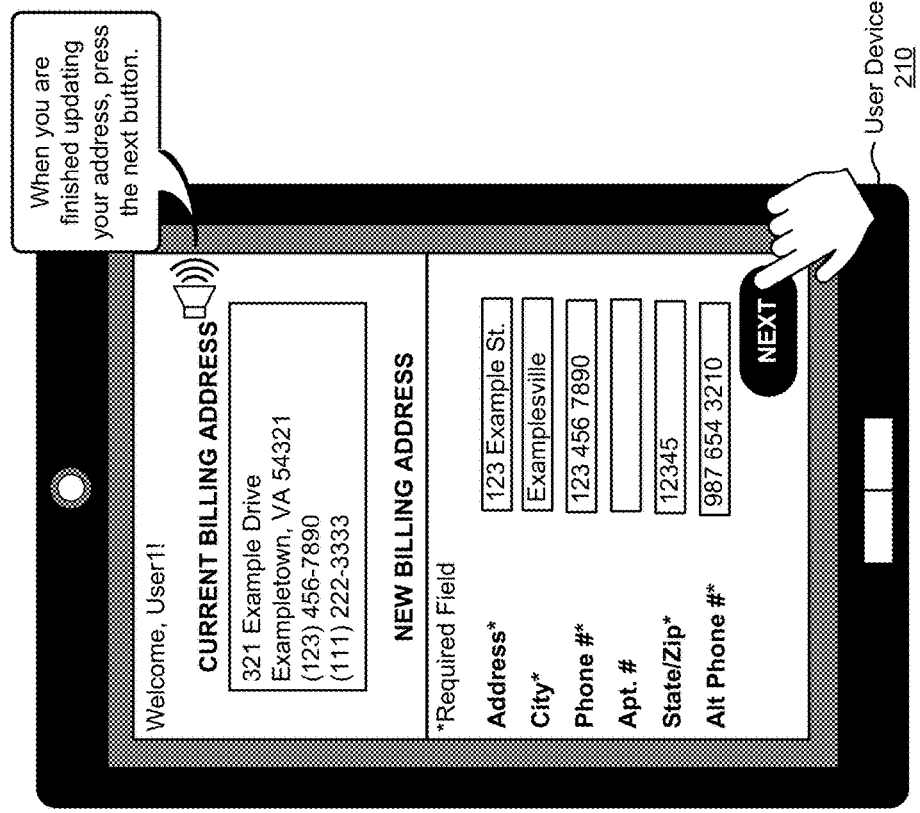

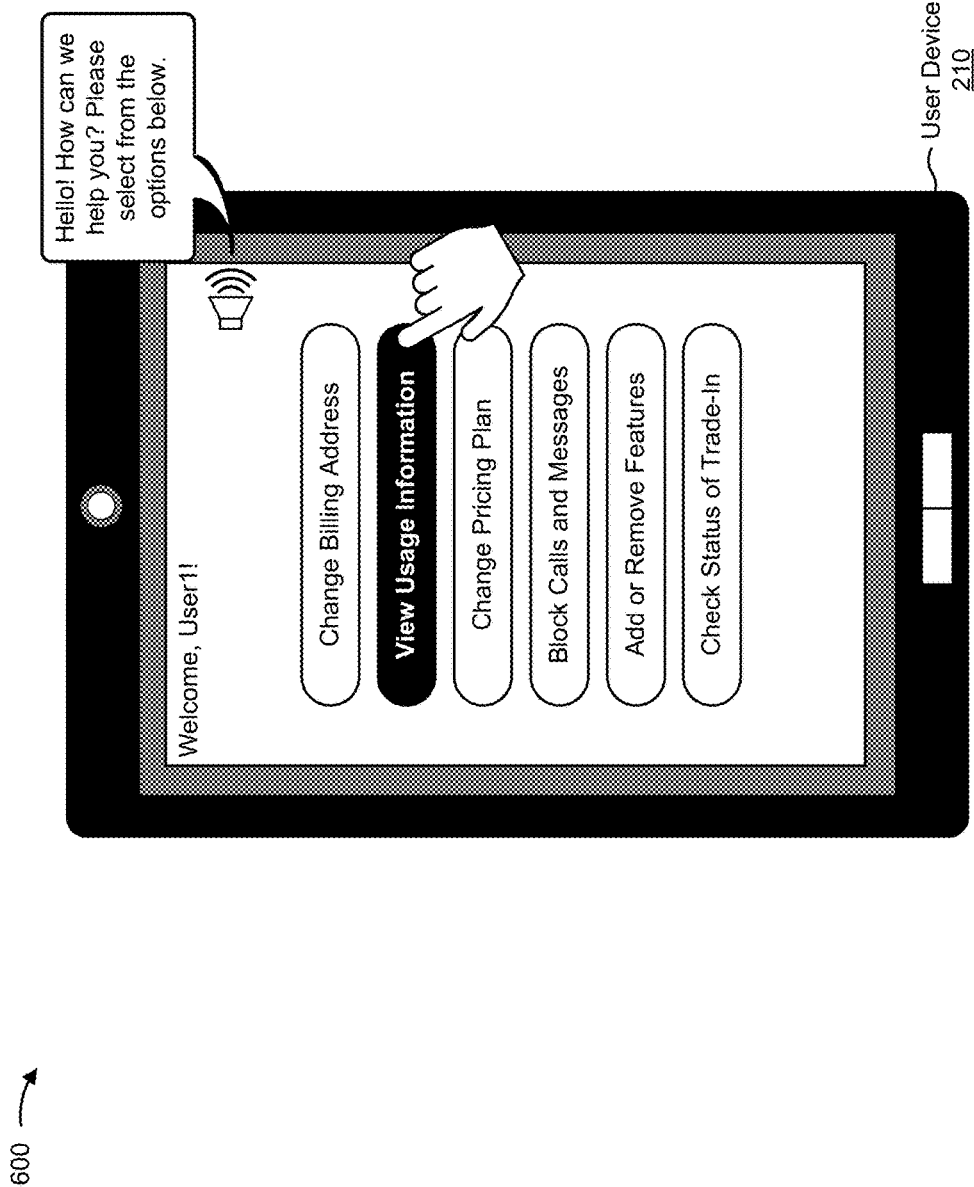

GENERATING AND PROVIDING A SELF-SERVICE DEMONSTRATION TO FACILITATE PERFORMANCE OF A SELF-SERVICE TASK

BACKGROUND

Web self-service is a type of electronic support service that allows customers and employees to access information and perform routine tasks over the Internet, without requiring any interaction with a human representative of an enterprise. Web self-service may be used in customer relationship management and employee relationship management.

SUMMARY

According to some possible implementations, a device may include one or more processors. The one or more processors may obtain a user identifier associated with a user. The one or more processors may identify a self-service task to be performed by the user using a user device. The self-service task may be a task that does not require the user to interact with another person. The one or more processors may obtain account information, specific to the user, based on the user identifier and the self-service task. The one or more processors may generate a self-service demonstration that includes instructions for performing the self-service task, media content for communicating the instructions, and the account information specific to the user. The one or more processors may provide the self-service demonstration for presentation to the user. The one or more processors may receive an indication of an interaction, by the user, with the self-service demonstration. The interaction may include user input, and the one or more processors may modify the account information based on the user input.

According to some possible implementations, a computer-readable medium may include one or more instructions that, when executed by one or more processors, cause the one or more processors to determine a user identifier associated with a user who is to perform a self-service task. The self-service task may be a task that does not require the user to interact with another person. The one or more instructions may cause the one or more processors to identify the self-service task to be performed by the user. The one or more instructions may cause the one or more processors to obtain account information, associated with the user, based on the user identifier and the self-service task. The one or more instructions may cause the one or more processors to generate code, for a self-service demonstration, that includes first code for an instruction for performing the self-service task, second code for media content that communicates the instruction, and third code for providing the account information associated with the user. The one or more instructions may cause the one or more processors to provide the code for the self-service demonstration to a user device for presentation. The one or more instructions may cause the one or more processors to receive an indication of an interaction, by the user, with the self-service demonstration. The interaction may include user input, and the one or more instructions may cause the one or more processors to modify the account information based on the user input.

According to some possible implementations, a method may include determining, by a device, a user identifier associated with a user who is to perform a self-service task. The self-service task may be a task that does not require the user to interact with another person. The method may include identifying, by the device, a self-service task identifier that identifies the self-service task to be performed by the user. The method may include obtaining, by the device and based on the self-service task identifier and the user identifier, account information associated with a user account of the user. The method may include generating, by the device, code for a self-service demonstration that includes the account information associated with the user, directions for performing the self-service task, and media content for communicating the directions. The method may include providing, by the device, the code for the self-service demonstration. The method may include receiving, by the device, an indication of an interaction, by the user, with the self-service demonstration. The interaction may include user input, and the method may include modifying, by the device, the user account based on the user input.

BRIEF DESCRIPTION OF THE DRAWINGS

FIGS. 5A-5H are diagrams of an example implementation relating to the example process shown in FIG. 4;

FIGS. 6A-6E are diagrams of an example implementation relating to the example process shown in FIG. 4;

DETAILED DESCRIPTION

The following detailed description of example implementations refers to the accompanying drawings. The same reference numbers in different drawings may identify the same or similar elements.

A user (e.g., a customer, an employee, etc.) associated with a business may contact a human representative of the business to perform tasks related to the business, such as to purchase goods or services, to modify account information associated with the user or the business, or the like. However, employing a human representative to conduct these tasks may be expensive and error-prone. Some businesses use self-service to permit users to perform tasks without interacting with a human representative. For example, a business may provide media content (e.g., audio, video, text, etc.), via a website, that describes how to perform a self-service task, and may separately provide input mechanisms that permit a user to perform the self-service task. However, because the instructions for performing the self-service task are separate from the mechanisms for performing the self-service task, a user may be required to leave the flow of the instructions to perform the self-service task. In this case, performing self-service tasks may be error-prone, and may result in a user contacting a human representative to perform the task. Implementations described herein assist in generating and creating a self-service demonstration that uses account information, associated with the user, as part of the instructions to explain how to perform the self-service task, and that permits the user to interact directly with the self-service demonstration to perform the self-service task, thereby saving time, reducing errors, and conserving resources.

Figure 1:
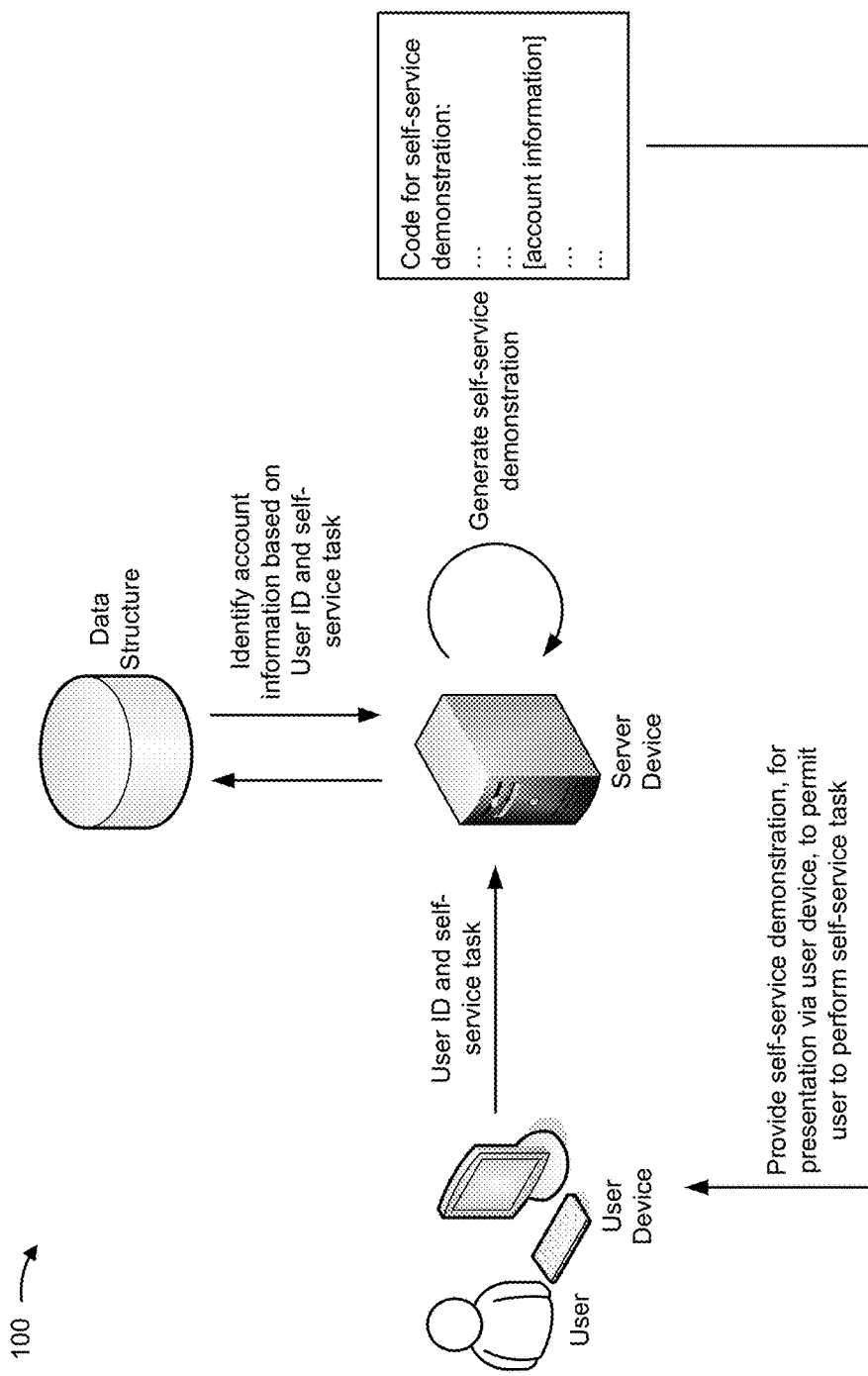
FIG. 1 is a diagram of an overview of an example implementation described herein.

FIG. 1 is a diagram of an overview of an example implementation 100 described herein. As shown in FIG. 1, assume that a user interacts with a user device (e.g., a computer) to cause the user device to provide a user identifier (e.g., a username) and information that identifies a self-service task to a server device. Assume that the self-service task is a task that does not require the user to interact with another person. As further shown, assume that the server device uses the user identifier and the self-service task to identify account information associated with the user. As an example, the server device may determine a type of account information needed to generate a self-service demonstration for performing the self-service task, and may identify the account information, of that type, associated with the user identifier (e.g., associated with a user account of the user).

As further shown in FIG. 1, assume that the server device uses the account information to generate a self-service demonstration that permits the user to perform the self-service task. For example, the self-service demonstration may include instructions for performing the self-service task, may include media content for communicating the instructions, and may include the account information. Additionally, or alternatively, the self-service demonstration may include one or more input mechanisms that permit the user to perform the self-service task. As shown, the server device may generate code for presenting the self-service demonstration. The server device may provide the self-service demonstration (e.g., the code for the self-service demonstration) to the user device.

The user device may present the self-service demonstration to permit the user to perform the self-service task. In some cases, the self-service task may include updating the account information. In this case, the user may use the user device to interact with the self-service demonstration to provide user input to update the account information. The user device may provide the user input to the server device, and the server device may use the user input to update the account information. In this way, the server device may conserve computing resources that would otherwise be wasted if the user could not easily edit account information using the self-service demonstration. Furthermore, the user may save time by updating the account information within the flow of receiving the instructions from the self-service demonstration.

Figure 2:
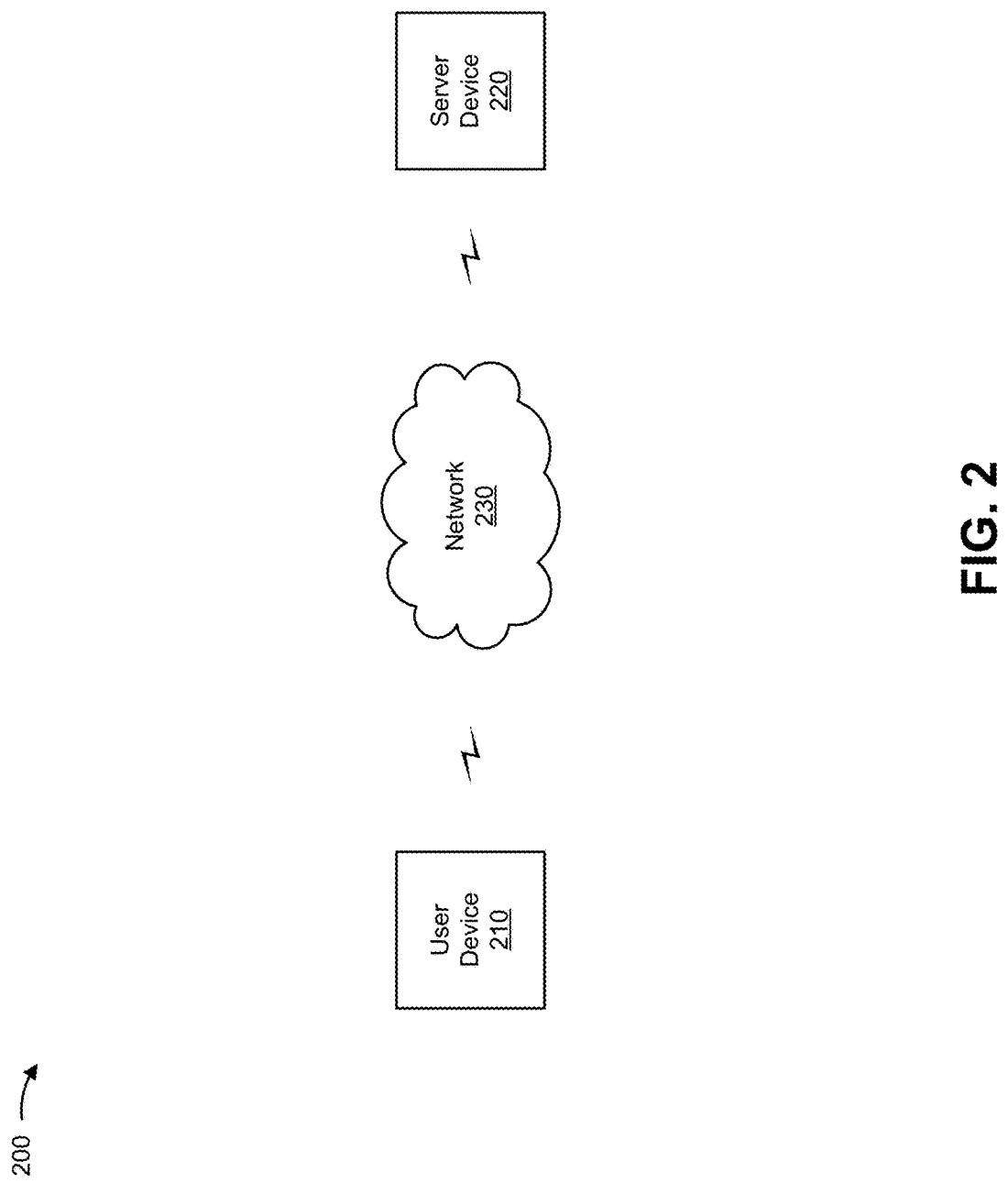
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include a user device 210, a server device 220, and a network 230. Devices of environment 200 may interconnect via wired connections, wireless connections, or a combination of wired and wireless connections.

User device 210 may include one or more devices capable of permitting a user to access and/or interact with a self-service demonstration that assists the user with performing a self-service task. For example, user device 210 may include a computing device, such as a desktop computer, a laptop computer, a tablet computer, a mobile phone (e.g., a smart phone, a radiotelephone, etc.), a server, or a similar type of device. As an example, user device 210 may execute an application (e.g., a web browser, a mobile application, etc.) that provides a user interface. The user interface may provide the self-service demonstration for display, and may receive user input via the self-service demonstration. In some implementations, the self-service demonstration may be generated by and/or received from server device 220, and the user input may be provided to server device 220 for performing the self-service task.

Server device 220 may include one or more devices capable of generating and/or providing a self-service demonstration that assists a user with performing a self-service task. In some implementations, server device 220 may include a computing device, such as a server (e.g., a web server, a host server, an application server, etc.), a desktop computer, or a similar type of device. In some implementations, server device 220 may receive account information, associated with a user, and may use the account information to generate a self-service demonstration, as described in more detail elsewhere herein. In some implementations, server device 220 may provide the self-service demonstration to user device 210, and may receive user input based on a user interaction with the self-service demonstration (e.g., using user device 210). Server device 220 may use the user input to perform the self-service task.

Network 230 may include one or more wired and/or wireless networks. For example, network 230 may include a cellular network (e.g., a long-term evolution (LTE) network, a 3G network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
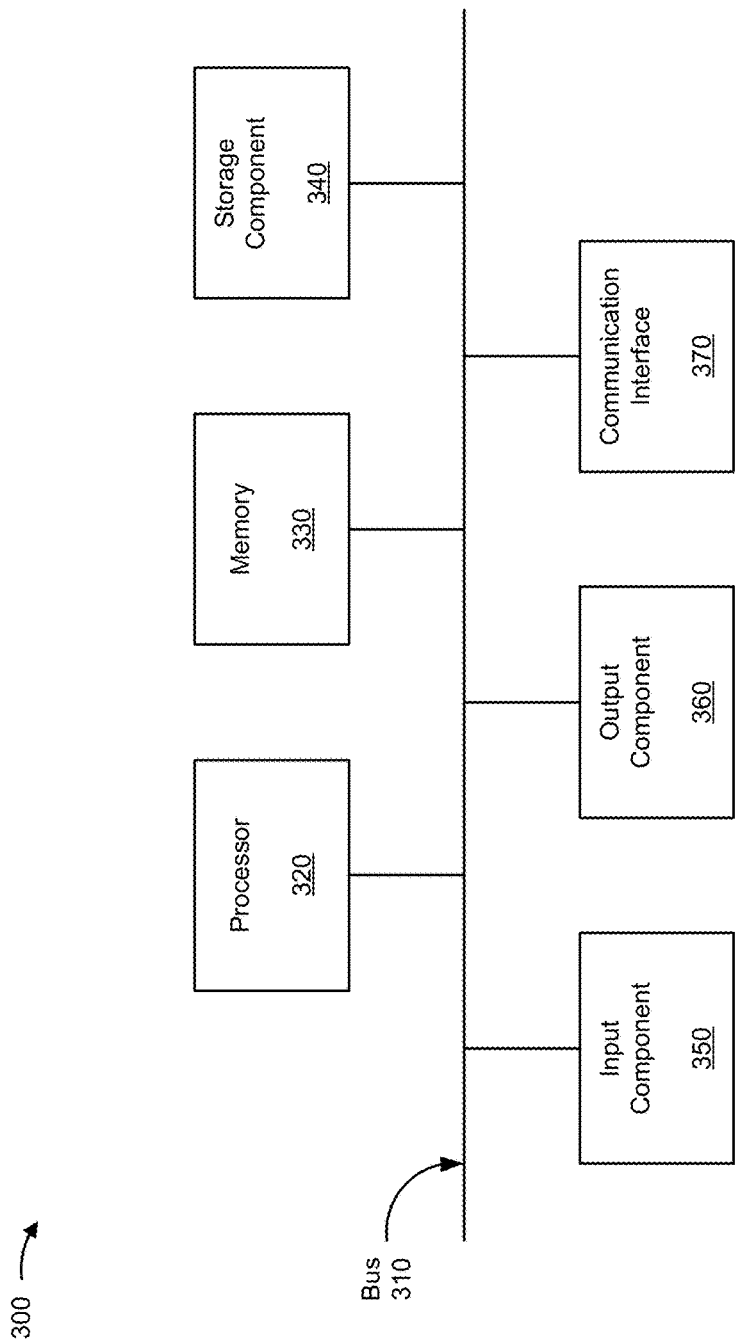
FIG. 3 is a diagram of example components of one or more devices of FIG. 2.

FIG. 3 is a diagram of example components of a device 300. Device 300 may correspond to user device 210 and/or server device 220. In some implementations, user device 210 and/or server device 220 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 may include a component that permits communication among the components of device 300. Processor 320 is implemented in hardware, firmware, or a combination of hardware and software. Processor 320 may include a processor (e.g., a central processing unit (CPU), a graphics processing unit (GPU), an accelerated processing unit (APU), etc.), a microprocessor, and/or any processing component (e.g., a field-programmable gate array (FPGA), an application-specific integrated circuit (ASIC), etc.) capable of performing a function. Memory 330 may include a random access memory (RAM), a read only memory (ROM), and/or another type of dynamic or static storage device (e.g., a flash memory, a magnetic memory, an optical memory, etc.) that stores information and/or instructions for use by processor 320.

Storage component 340 may store information and/or software related to the operation and use of device 300. For example, storage component 340 may include a hard disk (e.g., a magnetic disk, an optical disk, a magneto-optic disk, a solid state disk, etc.), a compact disc (CD), a digital versatile disc (DVD), a floppy disk, a cartridge, a magnetic tape, and/or another type of computer-readable medium, along with a corresponding drive.

Input component 350 may include a component that permits device 300 to receive information, such as via user input (e.g., a touch screen display, a keyboard, a keypad, a mouse, a button, a switch, a microphone, etc.). Additionally, or alternatively, input component 350 may include a sensor for sensing information (e.g., a global positioning system (GPS) component, an accelerometer, a gyroscope, an actuator, etc.). Output component 360 may include a component that provides output information from device 300 (e.g., a display, a speaker, one or more light-emitting diodes (LEDs), etc.).

Communication interface 370 may include a transceiver-like component (e.g., a transceiver, a separate receiver and transmitter, etc.) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes in response to processor 320 executing software instructions stored by a computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
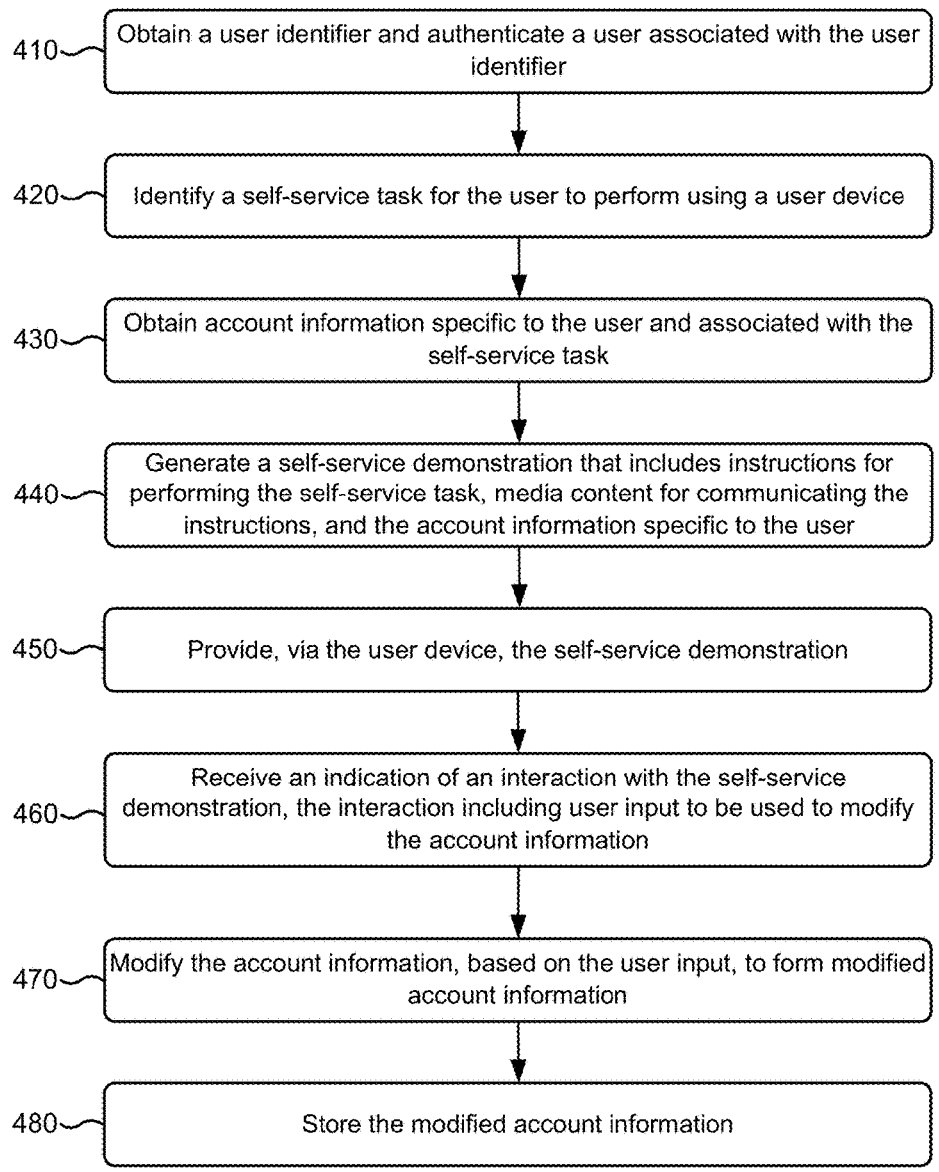
FIG. 4 is a flow chart of an example process for generating and providing a self-service demonstration to facilitate performance of a self-service task.

FIG. 4 is a flow chart of an example process 400 for generating and providing a self-service demonstration to facilitate performance of a self-service task. In some implementations, one or more process blocks of FIG. 4 may be performed by server device 220. In some implementations, one or more process blocks of FIG. 4 may be performed by another device or a set of devices separate from or including server device 220, such as user device 210.

As shown in FIG. 4, process 400 may include obtaining a user identifier and authenticating a user associated with the user identifier (block 410). For example, server device 220 may obtain a user identifier associated with a user. The user may be a customer of a business, an employee of the business, a partner of the business, a vendor of the business, or the like. In some implementations, server device 220 may provide (e.g., via an application, a web page, etc.) a request for login information from user device 210. User device 210 may provide an input mechanism (e.g., via an application, a web browser, etc.) that permits a user to input the login information. The user may interact with user device 210 to input a user identifier, such as a user name, an account number, or the like. User device 210 may provide the user identifier to server device 220.

Additionally, or alternatively, server device 220 may authenticate the user. For example, the user may input a password as part of the login information. User device 210 may provide the password to server device 220, and server device 220 may authenticate the user using the user identifier and/or the password.

As further shown in FIG. 4, process 400 may include identifying a self-service task for the user to perform using a user device (block 420). For example, server device 220 may identify a self-service task for the user to perform. In some implementations, server device 220 may provide task information that identifies one or more self-service tasks that the user may perform. User device 210 may receive the task information, may provide the task information for display, and may receive user input that identifies a self-service task to be performed. User device 210 may provide, to server device 220, information that identifies the self-service task to be performed (e.g., a selected self-service task from a group of self-service tasks).

A self-service task may include a task that a user can perform by interacting with a device, and without interacting with another person. In some implementations, the self-service task may add, remove, and/or modify account information associated with a user account. For example, the self-service task may include changing personal information, associated with the user, in a user account (e.g., a physical address, an email address, a phone number, a user identifier, a password, etc.). As another example, the self-service task may include adding a service to the user account, removing a service from the user account, modifying a service associated with the user account, or the like (e.g., a telephone service, a television service, an Internet service, a security service, etc.). Other examples of self-service tasks are described below in connection with FIGS. 5A-5H, 6A-6E, 7A-7G, 8A-8D, 9A-9H, and 10A-10D.

As further shown in FIG. 4, process 400 may include obtaining account information specific to the user and associated with the self-service task (block 430). For example, server device 220 may obtain account information associated with the user and the self-service task. In some implementations, server device 220 (or another device) may store, in a data structure, an indication of a type of account information required to generate a self-service demonstration for a particular type of self-service task. Server device 220 may then use an identified type of self-service task (e.g., identified as described above in connection with block 420) to identify a type of account information to be used to generate a self-service demonstration to assist the user in performing the identified type of self-service task. In some implementations, the type of self-service task may be indicated using a self-service task identifier (e.g., a sequence of characters).

In some implementations, server device 220 (or another device) may store, in a data structure, account information associated with a user identifier of the user (e.g., based on a user login). Server device 220 may then use the user identifier and the identified type of account information (e.g., identified as described above) to identify account information, of the identified type, that is specific to the user. Server device 220 may use the account information, specific to the user, to generate a self-service demonstration to assist the user in performing the identified type of self-service task.

As an example, assume that a user selects a self-service task of changing an address stored in the user's account information. Based on this selection, server device 220 searches a data structure to determine that, for an address change self-service task, address information is used to generate the self-service demonstration. Assume that the user logs in using a user identifier. Server device 220 may use the user identifier and the indication of the type of account information needed (in this case, address information) to identify address information specific to the user. For example, server device 220 may search a data structure to identify address information associated with the user identifier. Server device 220 may use the address information to generate the self-service demonstration.

As further shown in FIG. 4, process 400 may include generating a self-service demonstration that includes instructions for performing the self-service task, media content for communicating the instructions, and the account information specific to the user (block 440). For example, server device 220 may generate a self-service demonstration for instructing the user how to perform the self-service task. In some implementations, the self-service demonstration may include media content for instructing the user how to perform the self-service task. The media content may include, for example, video content, audio content, textual content, graphical content (e.g., an animation, an image, etc.), or the like. The media content may be used to communicate instructions and/or directions, for performing the self-service task, to the user (e.g., via user device 210).

In some implementations, server device 220 may generate the media content based on the account information specific to the user. The media content may include the account information specific to the user. For example, server device 220 may generate textual content (e.g., a textual instruction) that includes the account information (e.g., as text that appears on a display of user device 210), may generate audio content (e.g., an audio instruction) that includes the account information (e.g., as audio that plays via a speaker of user device 210), may generate video content (e.g., a video instruction) that includes the account information (e.g., in a visual portion of the video, in an audible portion of the video), or the like.

Additionally, or alternatively, the self-service demonstration may include one or more input mechanisms that permit the user to perform the self-service task. For example, the self-service demonstration may include a text box, a button, a check box, a dropdown box, a list box, a mechanism to receive text input, a mechanism to receive voice input, or the like.

As an example, server device 220 may generate code that includes the media content, the account information, and/or the one or more input mechanisms. The code may include, for example, hypertext markup language (HTML) code (e.g., HTML5 code). In this way, the self-service demonstration may include code that, when executed by a device (e.g., user device 210), causes the device to provide the self-service demonstration. For example, execution of the code may cause the device to provide the media content, to provide the instructions for performing the media content, to provide the account information (e.g., via the media content and/or the instructions), and/or to provide the input mechanism(s) with which the user may interact to perform the self-service task.

In some implementations, server device 220 may identify a code template based on the type of self-service task. The code template may include code for generating the self-service demonstration, and may include one or more code insertion indicators that indicate a location in the code where account information is to be inserted. Server device 220 may identify the account information associated with the user, and may insert the account information at a location in the code indicated by a code insertion indicator. In this way, server device 220 may generate code for the self-service demonstration that includes the account information.

Different portions of account information may be inserted in different locations of the code based on different code insertion indicators, in some implementations. In this case, server device 220 may tag different types of account information (e.g., a street address, a city, a zip code, etc.) with different tags, may identify a tag associated with a code insertion indicator, and may identify a type of account information to be inserted in the code based on the tag. In this way, server device 220 may flexibly generate the self-service demonstration based on account information associated with a user.

As further shown in FIG. 4, process 400 may include providing, via the user device, the self-service demonstration (block 450). For example, server device 220 may provide the self-service demonstration. In some implementations, server device 220 may provide the self-service demonstration for presentation (e.g., for display, for playback, etc.). Additionally, or alternatively, server device 220 may provide the self-service demonstration to user device 210 for display, playback, execution, etc. by user device 210. As an example, server device 220 may provide code for the self-service demonstration to user device 210. User device 210 may execute the code (e.g., using an application, such as a web browser), to cause the self-service demonstration to be presented. User device 210 may present the self-service demonstration visually, audibly, or the like.

The self-service demonstration may guide a user to perform a self-service task. In some implementations, the self-service demonstration may include multiple stages, with each stage requiring a user input before proceeding to the next stage. In this way, a user may step through the self-service demonstration at the user's own pace. A particular stage may include a portion of the identified account information specific to the user (e.g., a city included in a user's address), all of the identified account information specific to the user (e.g., a user's entire address), or none of the identified account information specific to the user (e.g., in an introductory stage that explains how the self-service demonstration works).

As further shown in FIG. 4, process 400 may include receiving an indication of an interaction with the self-service demonstration, the interaction including user input to be used to modify the account information (block 460). For example, a user may interact with the self-service demonstration (e.g., using user device 210), and server device 220 may receive an indication of the interaction. For example, user device 210 may provide an indication of the interaction to server device 220.

The interaction may include user input provided via the content of the self-service demonstration. For example, the self-service demonstration may include an input mechanism, such as a button, a text box, a selection mechanism (e.g., a radio button, a dropdown box, etc.), or the like. The user may interact with an input mechanism to provide user input, and user device 210 to provide the user input to server device 220.

In some implementations, the user input may include input to be used to modify the account information. As an example, the user may interact with the self-service demonstration to change a stored address associated with the user's account. In this case, the user input may include information that identifies a new address associated with the user. In some implementations, the user input may modify the account information provided via the self-service demonstration. In some implementations, the user input may modify other account information, other than the account information provided via the self-service demonstration. In this way, the self-service demonstration may guide a user to perform a self-service task, such as a self-service task that modifies account information associated with the user.

As further shown in FIG. 4, process 400 may include modifying the account information, based on the user input, to form modified account information (block 470), and storing the modified account information (block 480). For example, server device 220 may receive the user input, and may use the user input to modify the account information. Server device 220 may store the modified account information in a data structure, such as a data structure associated with the user's account. For example, server device 220 may replace old account information, associated with a user identifier of the user, with new account information received based on the user input. In this way, server device 220 may conserve computing resources that would otherwise be wasted if the user could not easily add, delete, or modify account information using the self-service demonstration.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

FIGS. 5A-5H are diagrams of an example implementation 500 relating to example process 400 shown in FIG. 4. FIGS. 5A-5H show an example of generating and providing a self-service demonstration to facilitate performance of a self-service task.

Figure 5A:
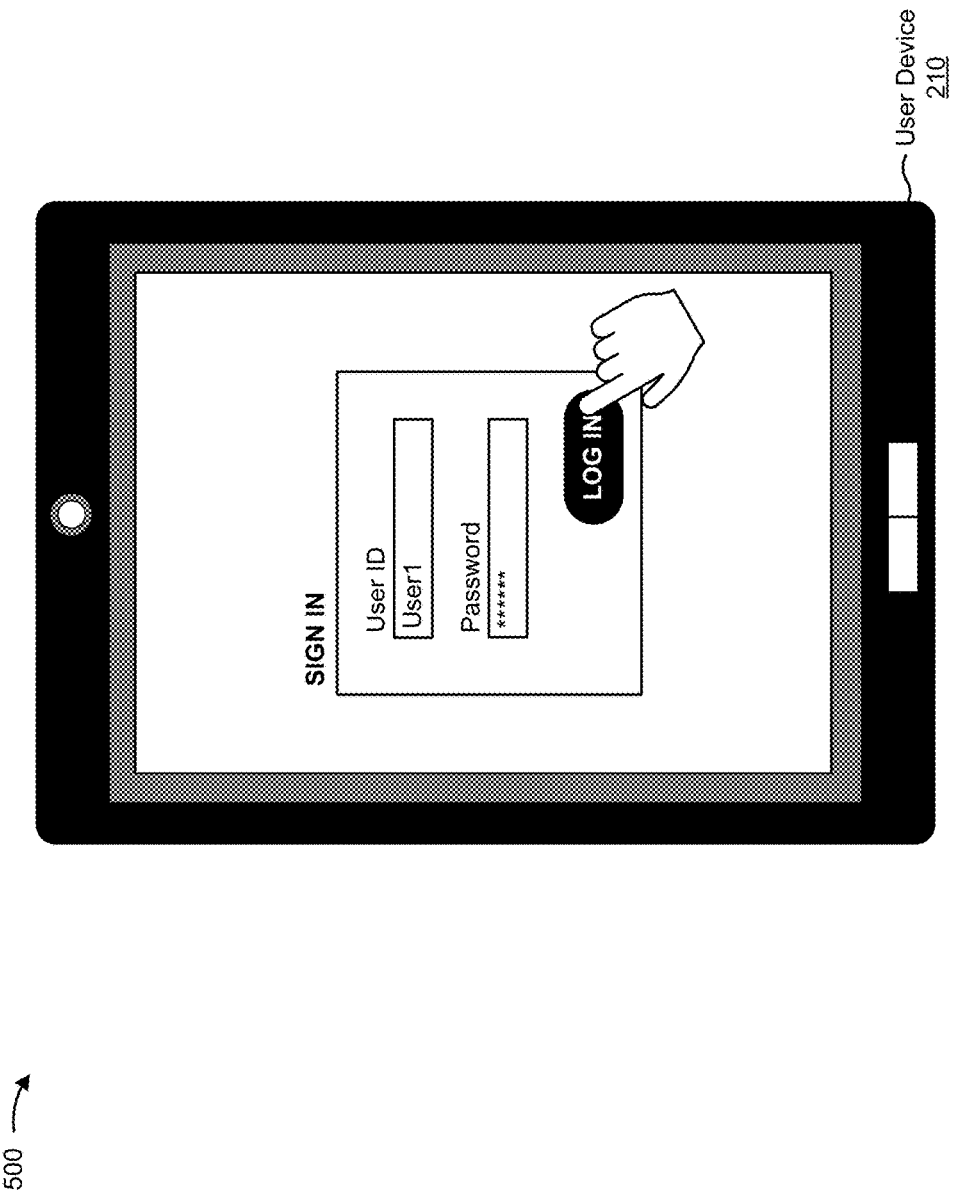

As shown in FIG. 5A, assume that a user interacts with user device 210 to log in to a website that permits the user to perform a self-service task. As shown, assume that the user inputs a user identifier, shown as "User1," and a password to authenticate the user.

For the purpose of FIG. 5B, assume that server device 220 authenticates the user using the user identifier and the password. Further, assume that server device 220 provides, to user device 210, a list of self-service tasks that the user may perform. As shown in FIG. 5B, assume that the user selects a self-service task of "Change Billing Address," which permits the user to interact with a self-service demonstration to modify the billing address associated with a user account of the user.

As shown in FIG. 5C, assume that server device 220 stores a data structure 505 that associates self-service tasks with one or more types of account information to be provided as part of self-service demonstrations for performing those self-service tasks. As an example, and as shown by reference number 510, a self-service task that permits a user to change a billing address is associated with an account information type of billing address. As shown by reference number 515, a self-service task that permits the user to view usage information is associated with account information types of billing cycle, mobile service plan, data usage, minutes usage, and messages usage.

As another example, and as shown by reference number 520, a self-service task that permits the user to change a pricing plan is associated with account information types of mobile service plan, available service plans, service plan promotions, user device type, data usage, minutes usage, messages usage, billing cycle, and user payment information. As shown by reference number 525, a self-service task that permits the user to block calls and messages is associated with account information types of mobile service plan, user device type, and blocked numbers.

As shown by reference number 530, a self-service task that permits the user to add or remove features from the user's account is associated with account information types of user device type, mobile service plan, user features, available products, product promotions, available applications, and user payment information. As shown by reference number 535, a self-service task that permits the user to check the status of a trade-in is associated with account information types of user device type and phone number.

Server device 220 may use data structure 505 to identify one or more types of account information to obtain from a user account for a particular type of self-service task that the user wishes to perform, as described in more detail below.

As shown in FIG. 5D, assume that server device 220 stores a data structure 540 that associates a user identifier, for a user, with account information associated with the user (e.g., stored in association with a user account of the user). As an example, and as shown, assume that User1 has a billing address of 321 Example Drive, Exampletown, Va. 54321, has a main phone number of (123) 456-7890, and has an alternate phone number of (111) 222-3333. As further shown, assume that User1 has a billing cycle with a payment due date on the 15th of each month. Assume that User1 has a mobile service plan of an unlimited plan, has a data usage of zero, has a minutes usage of zero, and has a messages usage of zero.

As further shown, assume that User1 has a user device type of Example Phone 4, and does not have any blocked numbers stored in the account information. Furthermore, assume that Unlimited Plan, Plan 1, and Plan 2 are available service plans for the user. Assume that User1 has an available service plan promotion of $100 per month for Plan 1, and an available service plan promotion of 50% off Example Phone 5 for the Unlimited Plan. Assume that the account information includes user payment information as shown, one or more user features, and one or more available products (e.g., Example Phone 3, Example Phone 4, and Example Phone 5). Assume that User1 has an available product promotion of 50% off Example Phone 5. Finally, assume that User1 has three ring tones as available applications.

Server device 220 may use data structure 540 to identify account information, specific to a user, to be included in a self-service demonstration that permits the user to perform a self-service task, as described in more detail below.

Figure 5E:
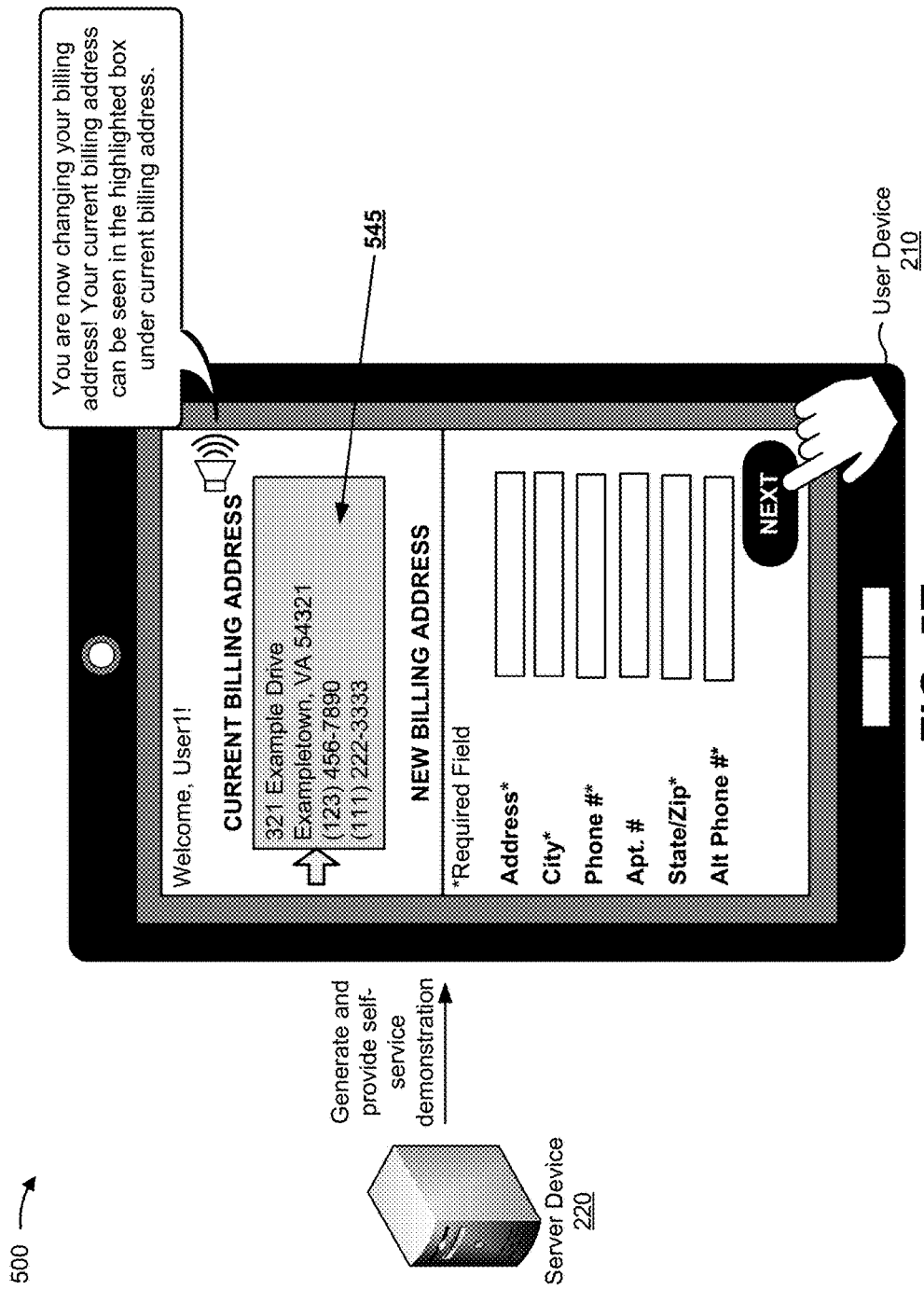

As shown in FIG. 5E, assume that server device 220 generates a self-service demonstration and provides the self-service demonstration to user device 210 for presentation. In this case, the self-service demonstration relates to a self-service task to change a billing address. Thus, server device 220 uses data structure 505 to identify an account information type of billing address, which is used to generate the self-service demonstration. Based on the account information type of billing address, server device 220 uses data structure 540 to identify a billing address associated with the user. Server device 220 includes the billing address as part of the self-service demonstration, as shown by reference number 545.

As further shown in FIG. 5E, assume that the self-service demonstration includes audio content that guides the user through changing the billing address. In this case, the audio content indicates that the user's current billing address is displayed. As shown, the user may proceed to a next stage of the self-service demonstration by interacting with the "Next" button.

As shown in FIG. 5F, interacting with the "Next" button causes a next stage of the self-service demonstration to be provided for display. In this case, assume that additional audio content instructs the user to fill out the highlighted fields to change the user's billing address.

As shown in FIG. 5G, assume that the user fills in the fields to input a new address and a new alternate phone number of (987) 654-3210. Further, assume that the user proceeds to a next stage of the self-service demonstration by interacting with the "Next" button.

Figure 5H:
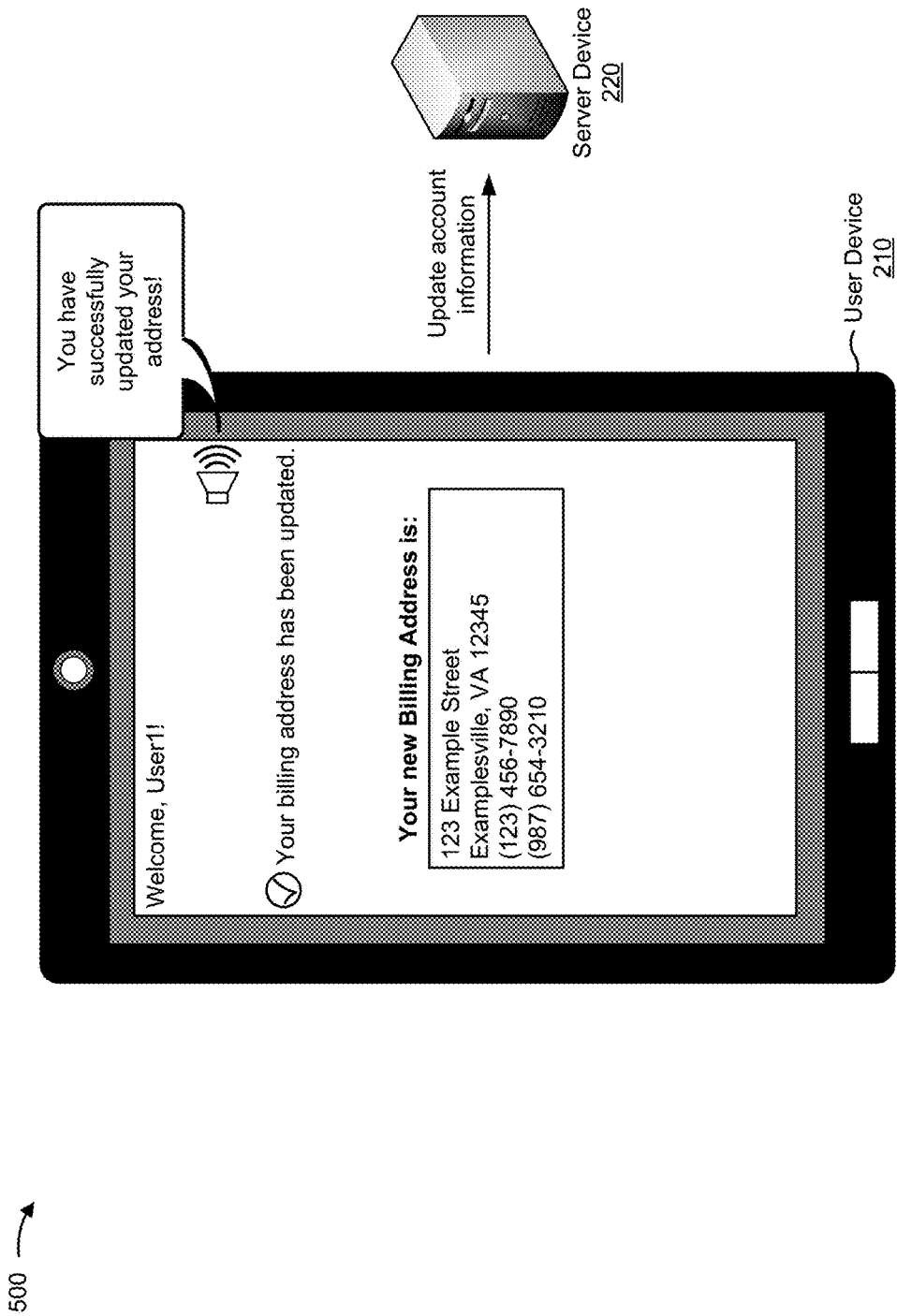

As shown in FIG. 5H, assume that the next stage of the self-service demonstration includes a confirmation screen that indicates that the user's account information has been successfully updated. In this case, assume that user device 210 provides the user input of the new address and the new alternate phone number to server device 220, and that server device 220 updates the user's stored address and alternative phone number based on the user input. In this way, the user may update account information using the self-service demonstration, which may save time and/or computing resources as compared to other mechanisms for updating the account information.

As indicated above, FIGS. 5A-5H are provided merely as an example. Other examples are possible and may differ from what was described with regard to FIGS. 5A-5H.

FIGS. 6A-6E are diagrams of an example implementation 600 relating to example process 400 shown in FIG. 4. FIGS. 6A-6E show an example of generating and providing a self-service demonstration to facilitate performance of a self-service task.

Figure 6B:
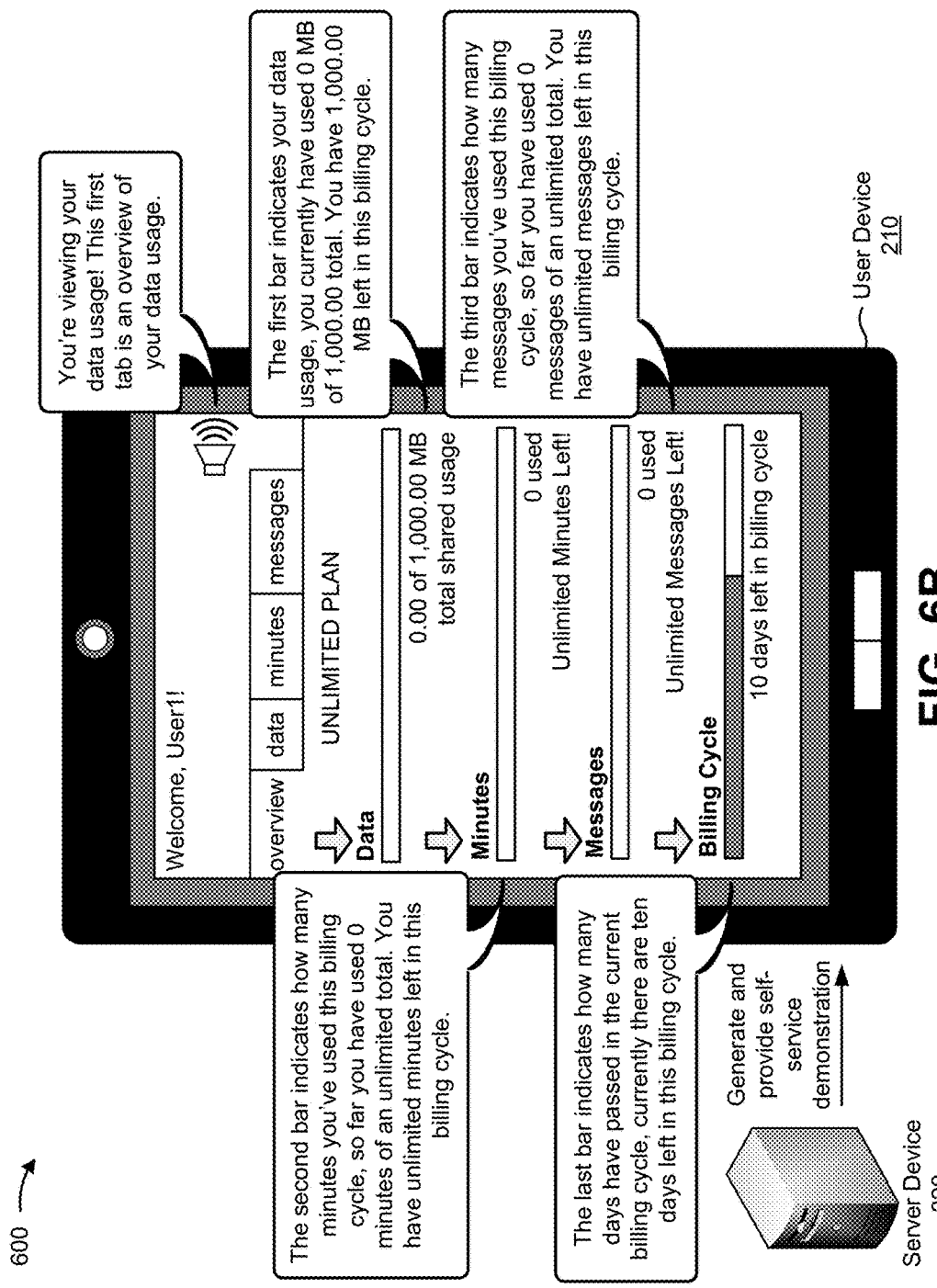

For the purpose of FIGS. 6A-6E, assume that a user interacts with user device 210 to log in to a website that permits the user to perform a self-service task. In this case, assume that the user inputs a user identifier of "User1" to log in to the website. As shown in FIG. 6A, assume that the user selects a self-service task of "View Usage Information," which permits the user to interact with a self-service demonstration to view the usage information associated with a user account of the user.

As shown in FIG. 6B, assume that server device 220 generates a self-service demonstration and provides the self-service demonstration to user device 210 for presentation. In this case, the self-service demonstration relates to a self-service task to view usage information. Thus, server device 220 uses a data structure (e.g., data structure 505, shown in FIG. 5C) to identify account information types of billing cycle, mobile service plan, data usage, minutes usage, and messages usage, which may be used to generate the self-service demonstration (e.g., as shown by reference number 515 of FIG. 5C). Based on these account information types, server device 220 uses a data structure (e.g., data structure 540, shown in FIG. 5D) to identify a billing cycle, a mobile service plan, a data usage, a minutes usage, and a messages usage associated with the user. Server device 220 may include this information as part of the self-service demonstration, as shown in FIG. 6B.

As further shown in FIG. 6B, assume that the self-service demonstration includes audio content and visual content that guides the user through viewing the user's usage information. In this case, the audio content and visual content provided via the self-service demonstration indicate the user's usage information on an overview tab which shows the user's data usage, minutes usage, messages usage, and billing cycle.

Figure 6C:
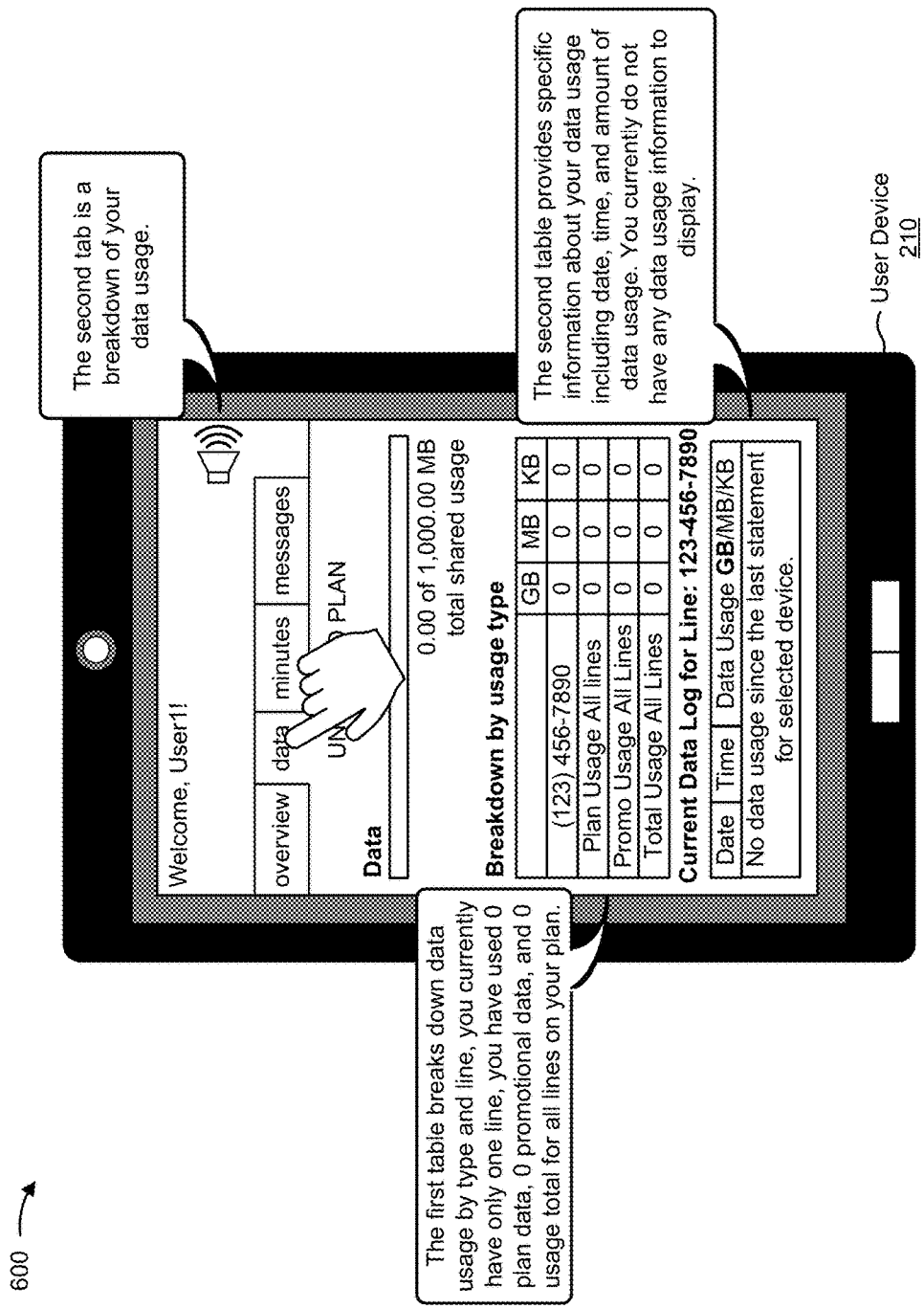

As shown in FIG. 6C, assume that the user interacts with a data tab included in the self-service demonstration. In this case, the audio content and visual content provided via the self-service demonstration indicate the user's usage information on a data tab which shows the user's data usage and a breakdown of the user's data usage.

Figure 6D:
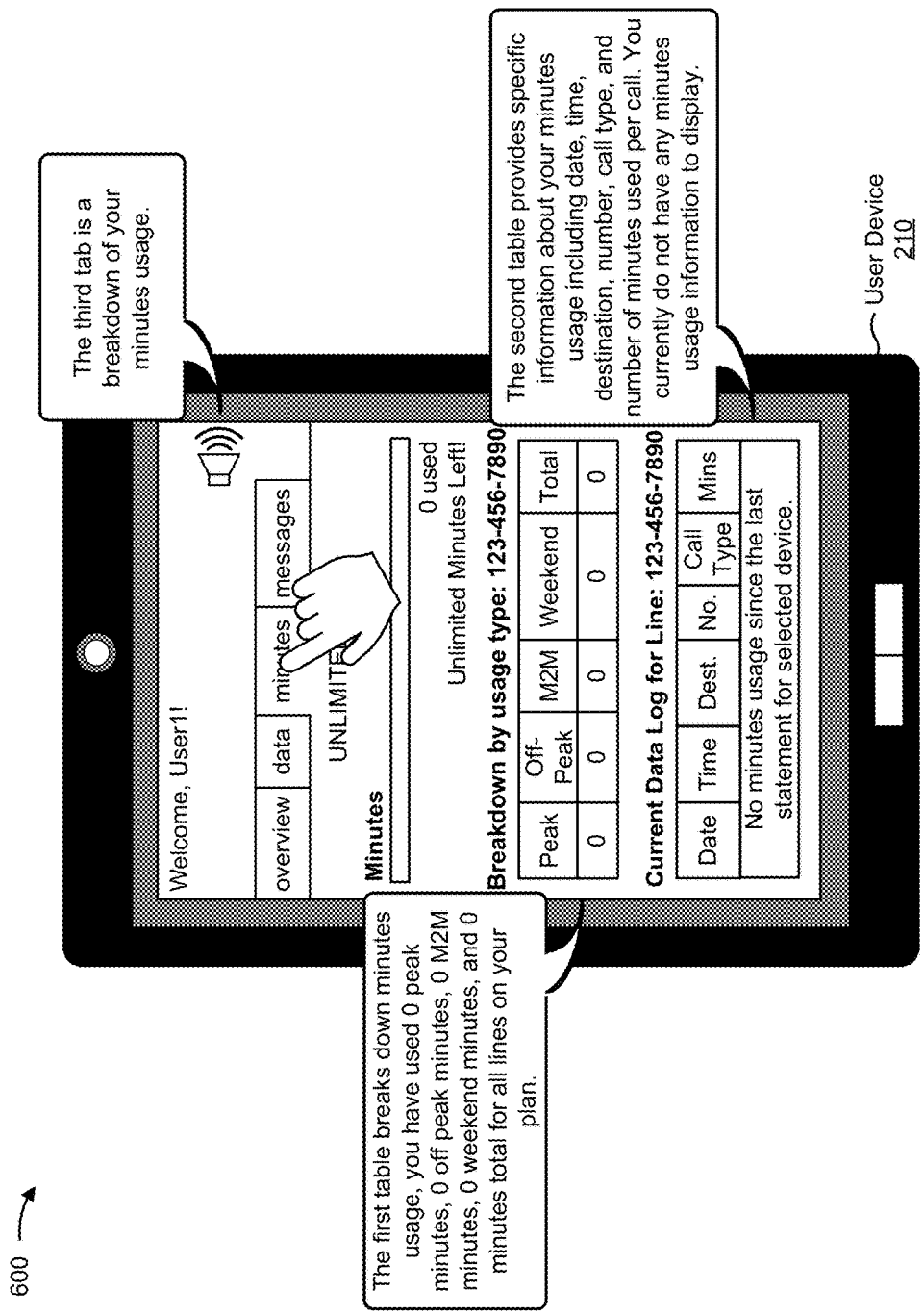

As shown in FIG. 6D, assume that the user interacts with a minutes tab included in the self-service demonstration. In this case, the audio content and visual content provided via the self-service demonstration indicate the user's usage information on a minutes tab which shows the user's minutes usage and a breakdown of the user's minutes usage.

Figure 6E:
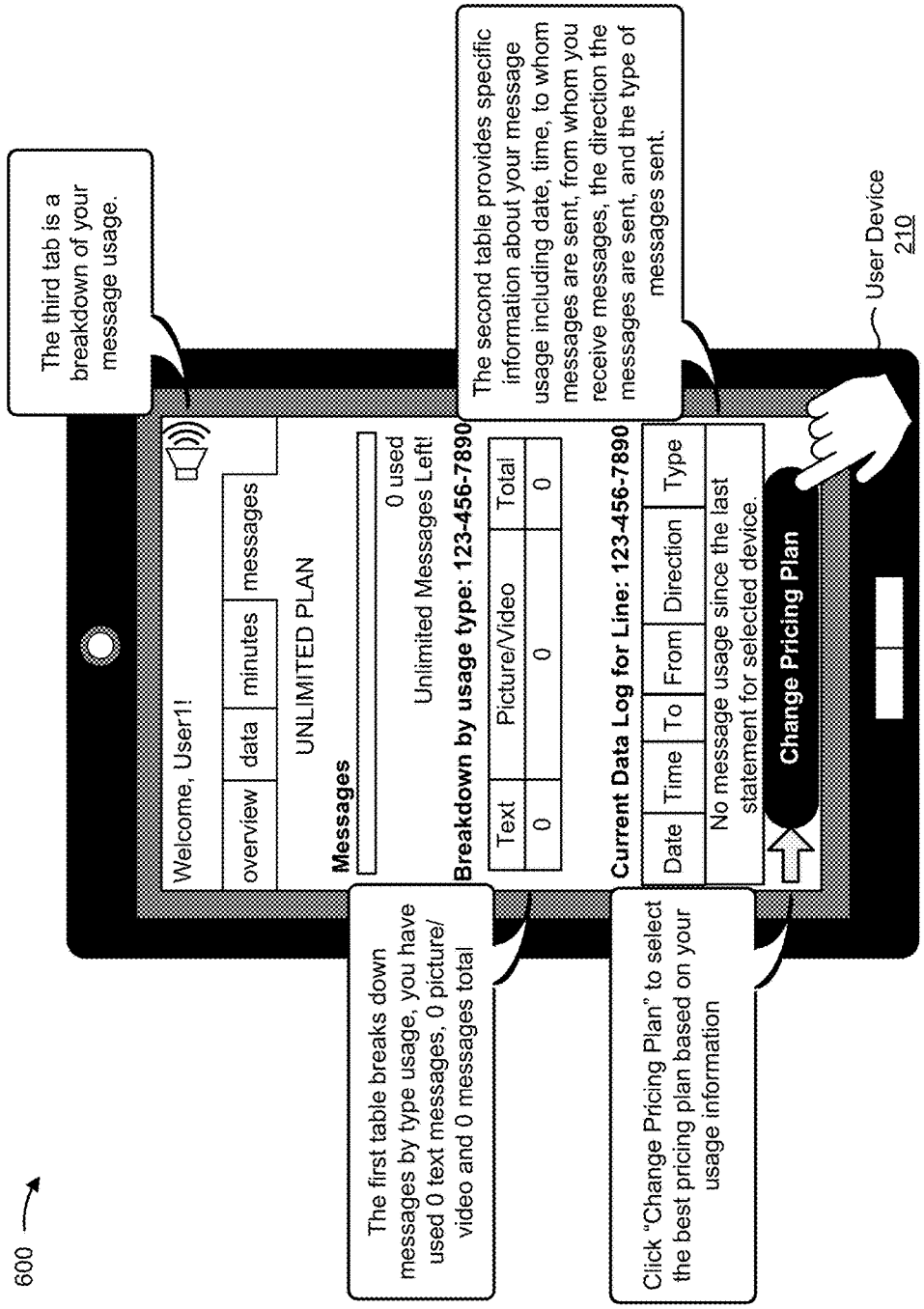

For the purpose of FIG. 6E, assume that the user interacts with a messages tab included in the self-service demonstration. In this case, the audio content and visual content provided via the self-service demonstration indicate the user's usage information on a messages tab which shows the user's messages usage and a breakdown of the user's messages usage. As further shown, the self-service demonstration may include an input mechanism that permits the user to change a pricing plan based on the user's usage information. Additionally, or alternatively, the user may interact with another input mechanism to change a pricing plan, as described below in connection with FIG. 7A. In this way, the user may view and/or update account information using the self-service demonstration, which may save time and/or computing resources as compared to other mechanisms for viewing and/or updating the account information.

As indicated above, FIGS. 6A-6E are provided merely as an example. Other examples are possible and may differ from what was described with regard to FIGS. 6A-6E.

FIGS. 7A-7G are diagrams of an example implementation 700 relating to example process 400 shown in FIG. 4. FIGS. 7A-7G show an example of generating and providing a self-service demonstration to facilitate performance of a self-service task.

Figure 7A:
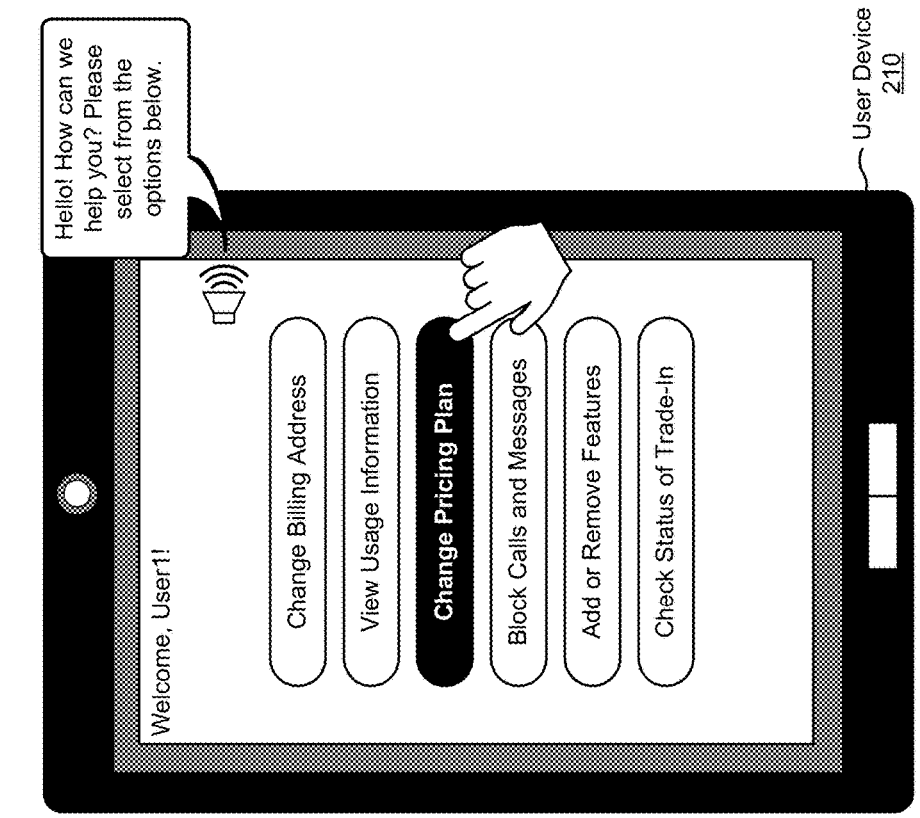
FIGS. 7A-7G are diagrams of an example implementation relating to the example process shown in FIG. 4.

For the purpose of FIGS. 7A-7G, assume that a user interacts with user device 210 to log in to a website that permits the user to perform a self-service task. In this case, assume that the user inputs a user identifier of "User1" to log in to the website. As shown in FIG. 7A, assume that the user selects a self-service task of "Change Pricing Plan," which permits the user to interact with a self-service demonstration to change a pricing plan associated with a user account of the user.

Figure 7B:
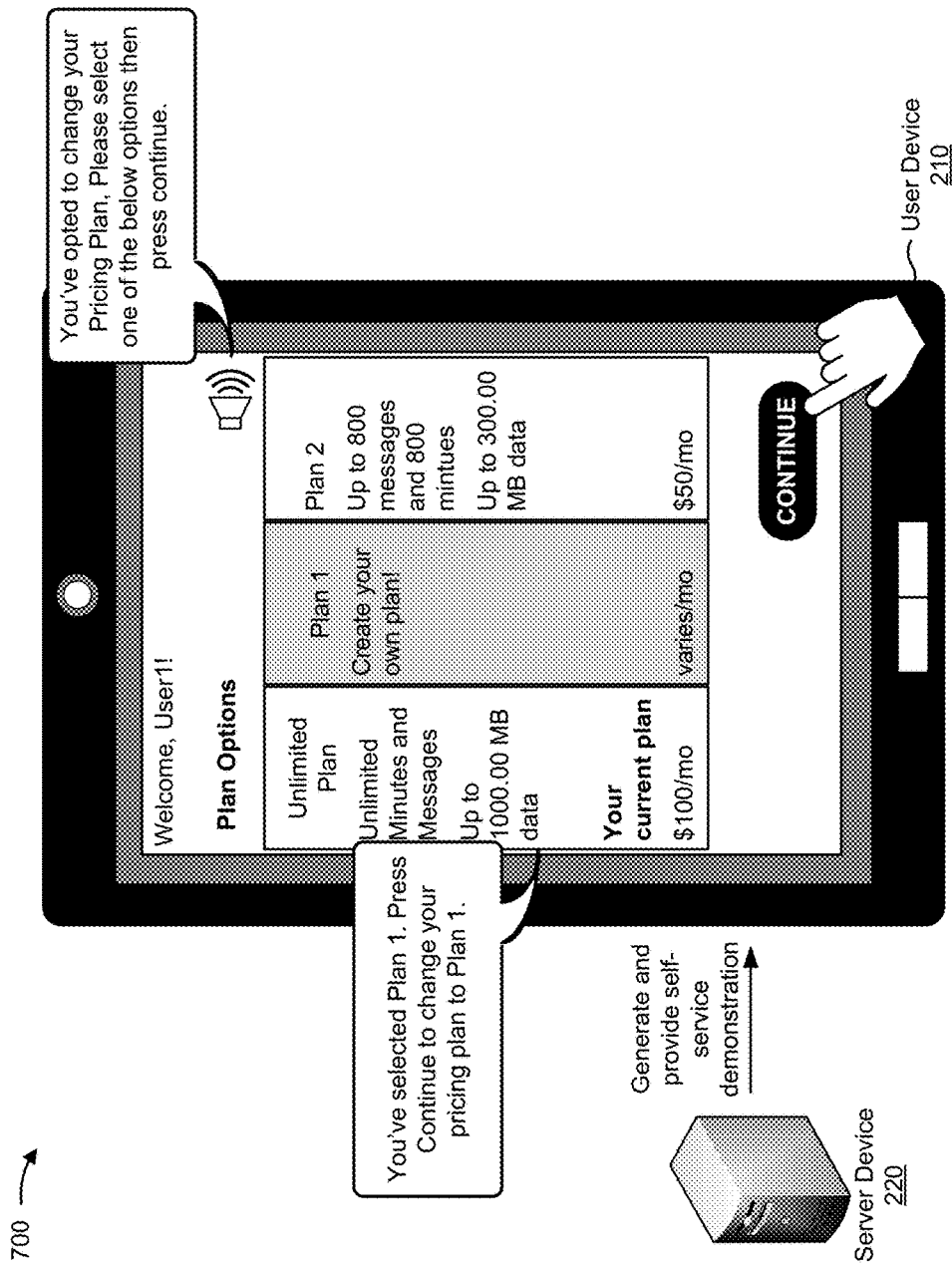

As shown in FIG. 7B, assume that server device 220 generates a self-service demonstration and provides the self-service demonstration to user device 210 for presentation. In this case, the self-service demonstration relates to a self-service task to change a pricing plan. Thus, server device 220 uses a data structure (e.g., data structure 505, shown in FIG. 5C) to identify account information types of mobile service plan, available service plans, service plan promotions, user device type, data usage, minutes usage, messages usage, billing cycle, and user payment information, which may be used to generate the self-service demonstration (e.g., as shown by reference number 520 of FIG. 5C). Based on these account information types, server device 220 uses a data structure (e.g., data structure 540, shown in FIG. 5D) to identify a mobile service plan, available service plans, service plan promotions, a user device type, a data usage, a minutes usage, a messages usage, a billing cycle, and user payment information associated with a user account of the user. Server device 220 may include this information as part of the self-service demonstration, as shown in FIG. 7B.

As further shown in FIG. 7B, assume that the self-service demonstration includes audio content and visual content that guides the user through changing the user's pricing plan. In this case, the audio content and visual content provided via the self-service demonstration indicate the user's current pricing plan (e.g., a mobile service plan), as well as service plans that are available to the user (e.g., available service plans). As shown, assume that the user selects to create a plan (e.g., "Plan 1: Create your own plan!"). As further shown, the user may proceed to a next stage of the self-service demonstration by interacting with the "Continue" button.

Figure 7C:
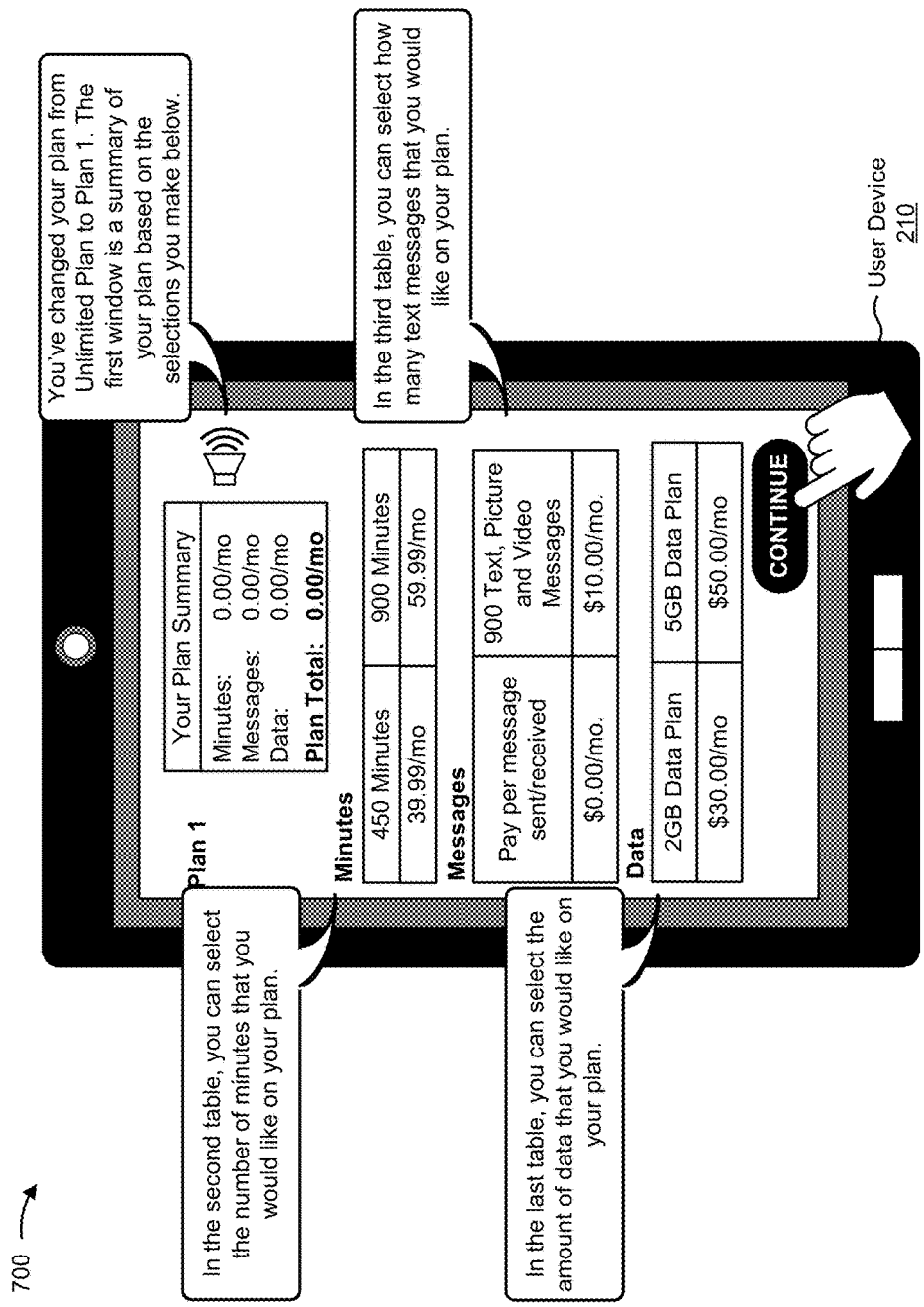

As shown in FIG. 7C, assume that the self-service demonstration provides the user's current pricing plan for display (e.g., determined from data structure 540 of FIG. 5D). As further shown, assume that audio content and the visual content explain how to update a pricing plan by selecting a maximum minutes usage, a maximum messages usage, and a maximum data usage. As further shown, the user may proceed to a next stage of the self-service demonstration by interacting with the "Continue" button.

Figure 7D:
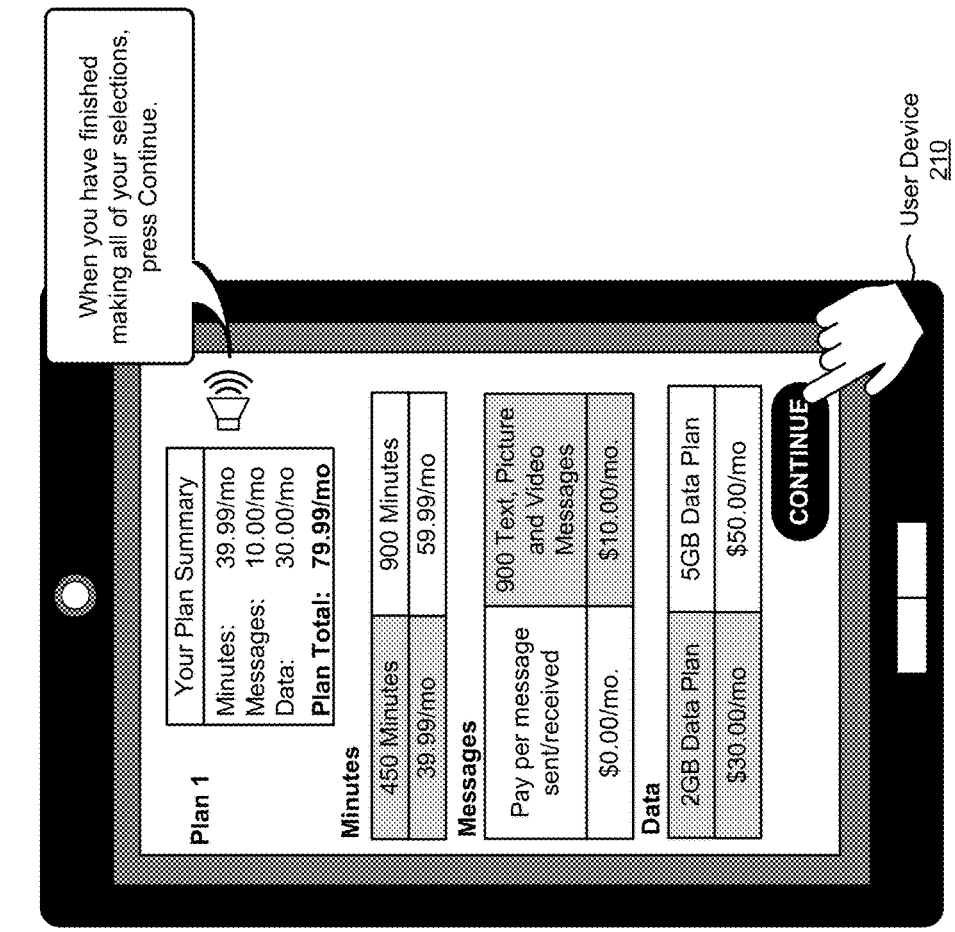

As shown in FIG. 7D, the self-service demonstration may provide input mechanisms for the user to modify the pricing plan. For example, the user may interact with the self-service demonstration to modify a maximum minutes usage, a maximum messages usage, and a maximum data usage for the user's pricing plan. Assume that after modifying the user's pricing plan, the user proceeds to a next stage of the self-service demonstration by interacting with the "Continue" button.

Figure 7E:
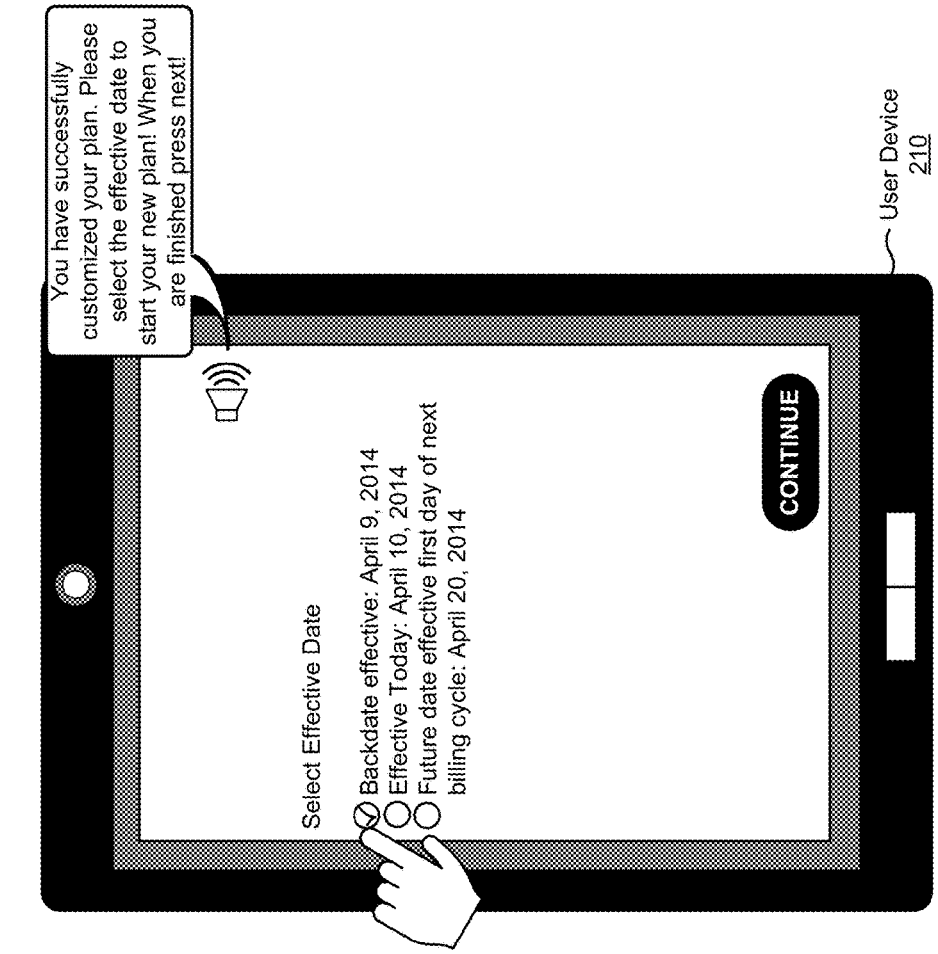

As shown in FIG. 7E, the self-service demonstration may provide input mechanisms for the user to further modify the pricing plan. For example, the user may interact with the self-service demonstration to modify an effective date for the user's new pricing plan. Assume that after modifying the effective date, the user proceeds to a next stage of the self-service demonstration by interacting with the "Continue" button.

Figure 7F:
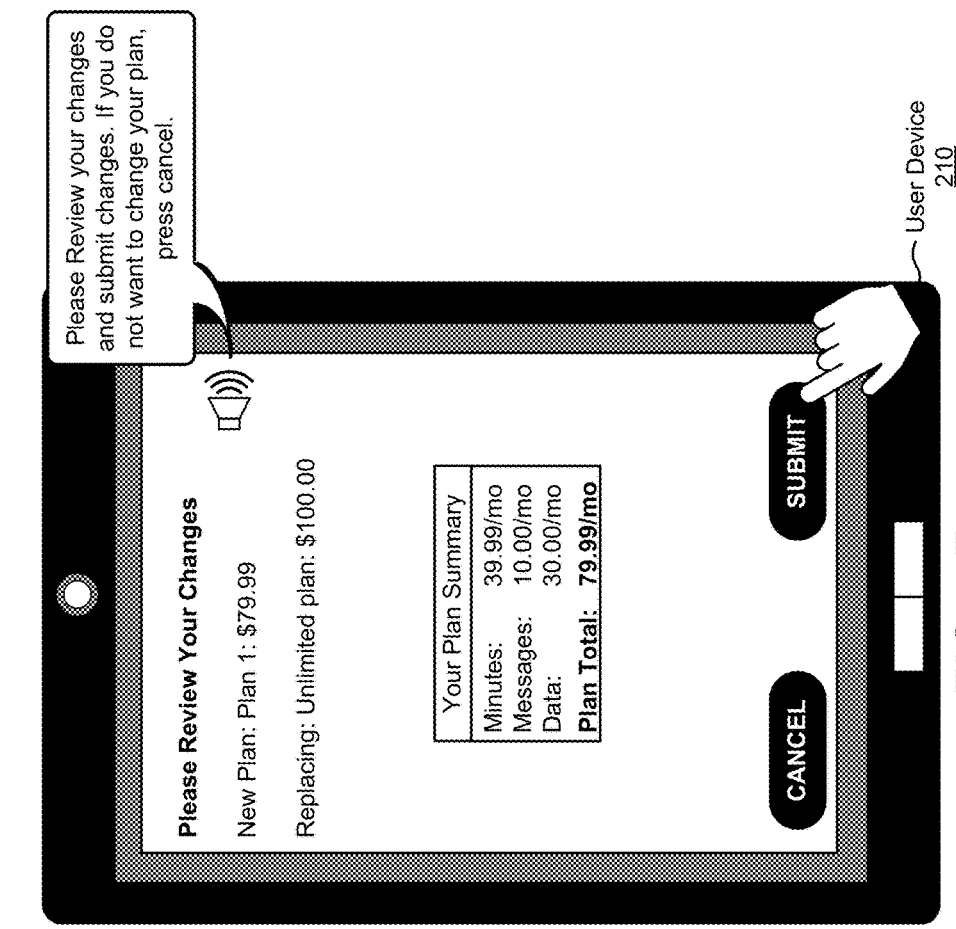

As shown in FIG. 7F, the self-service demonstration may provide a summary of the user's newly input pricing plan for the user to review. Assume that after reviewing the new pricing plan, the user proceeds to a next stage of the self-service demonstration by interacting with the "Submit" button to submit the changes.

Figure 7G:
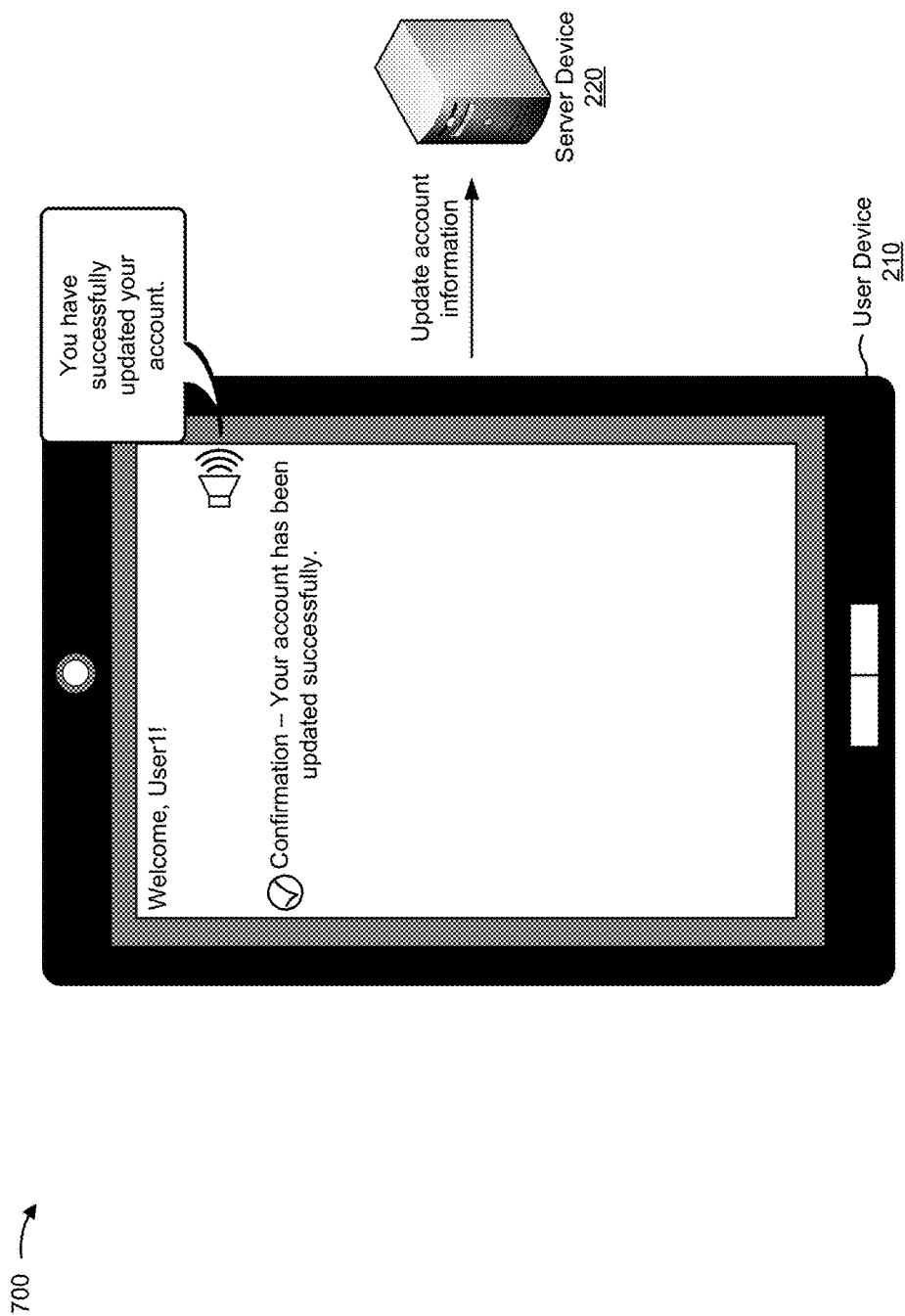

As shown in FIG. 7G, assume that the next stage of the self-service demonstration includes a confirmation screen that indicates that the user's account information has been successfully updated. In this case, assume that user device 210 provides information associated with the new pricing plan to server device 220, and that server device 220 replaces the user's old pricing plan with the new pricing plan. In this way, server device 220 may update account information using the self-service demonstration, which may save computing resources as compared to other mechanisms for updating the account information.

As indicated above, FIGS. 7A-7G are provided merely as an example. Other examples are possible and may differ from what was described with regard to FIGS. 7A-7G.

FIGS. 8A-8D are diagrams of an example implementation 800 relating to example process 400 shown in FIG. 4. FIGS. 8A-8D show an example of generating and providing a self-service demonstration to facilitate performance of a self-service task.

Figure 8A:
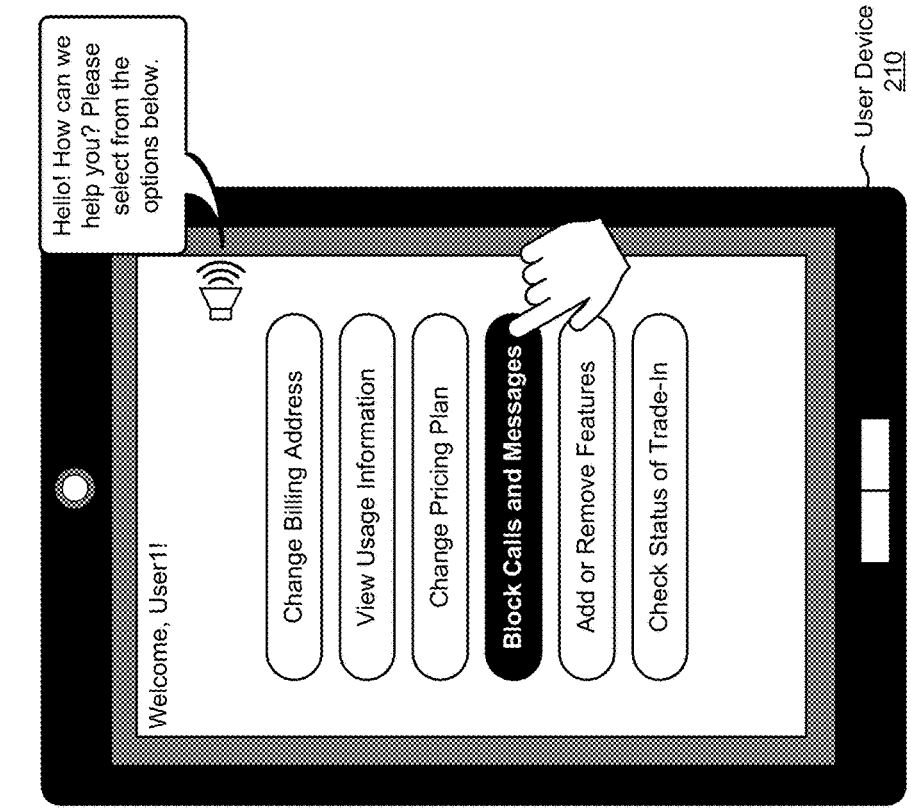
FIGS. 8A-8D are diagrams of an example implementation relating to the example process shown in FIG. 4.

For the purpose of FIGS. 8A-8D, assume that a user interacts with user device 210 to log in to a website that permits the user to perform a self-service task. In this case, assume that the user inputs a user identifier of "User1" to log in to the website. As shown in FIG. 8A, assume that the user selects a self-service task of "Block Calls and Messages," which permits the user to interact with a self-service demonstration to add, remove, or modify phone numbers for which calls and messages are to be blocked from reception by a user device of the user.

Figure 8B:
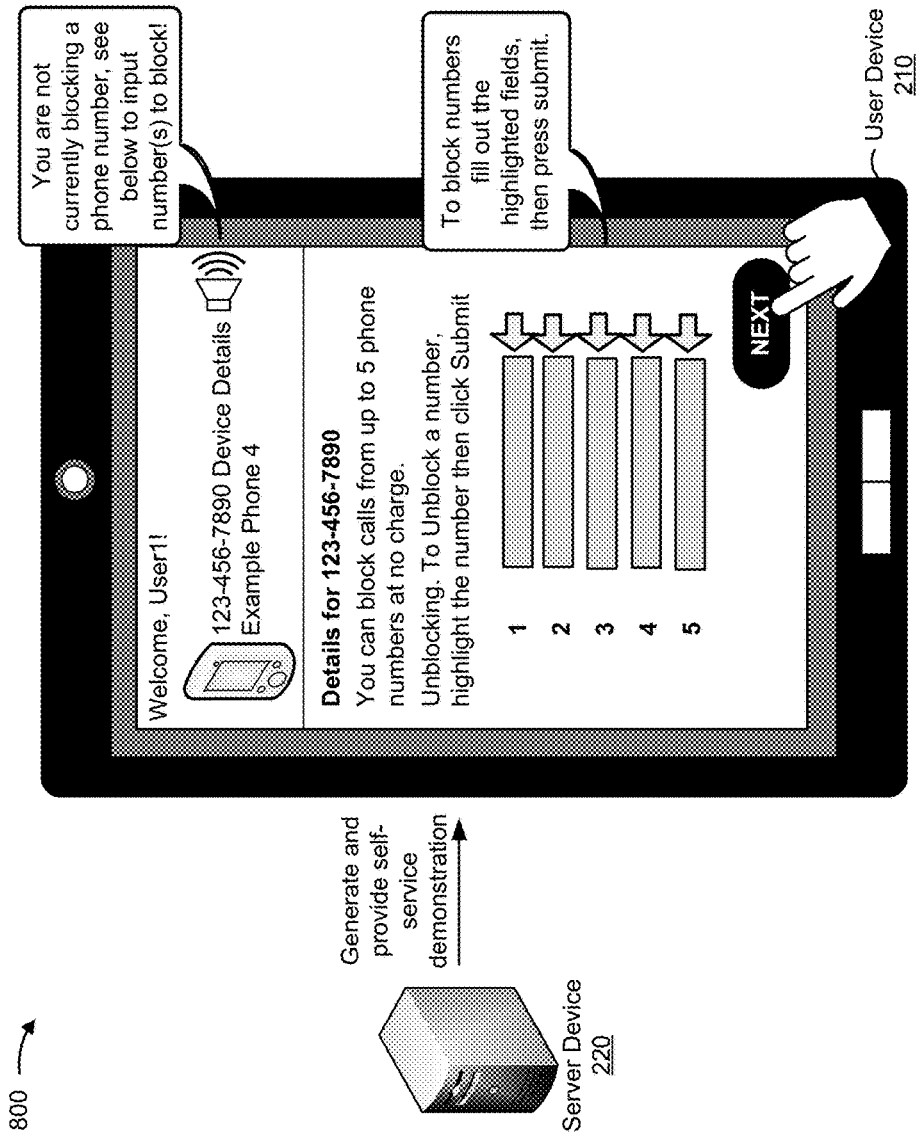

As shown in FIG. 8B, assume that server device 220 generates a self-service demonstration and provides the self-service demonstration to user device 210 for presentation. In this case, the self-service demonstration relates to a self-service task to block calls and messages. Thus, server device 220 uses a data structure (e.g., data structure 505, shown in FIG. 5C) to identify account information types of mobile service plan, user device type, and blocked numbers, which may be used to generate the self-service demonstration (e.g., as shown by reference number 525 of FIG. 5C). Based on these account information types, server device 220 uses a data structure (e.g., data structure 540, shown in FIG. 5D) to identify a mobile service plan, a user device type, and block numbers associated with a user account of the user. Server device 220 may include this information as part of the self-service demonstration, as shown in FIG. 8B.

As further shown in FIG. 8B, assume that the self-service demonstration includes audio content and visual content that guides the user through blocking a phone number. In this case, the audio content and visual content provided via the self-service demonstration indicate the user's current blocked numbers (in this case, none), as well as an instruction to explain how the user may block a number. In this case, the self-service demonstration indicates that the user is to input a number into a text box to block that number. As further shown, the user may proceed to a next stage of the self-service demonstration by interacting with a "Next" button.

Figure 8C:
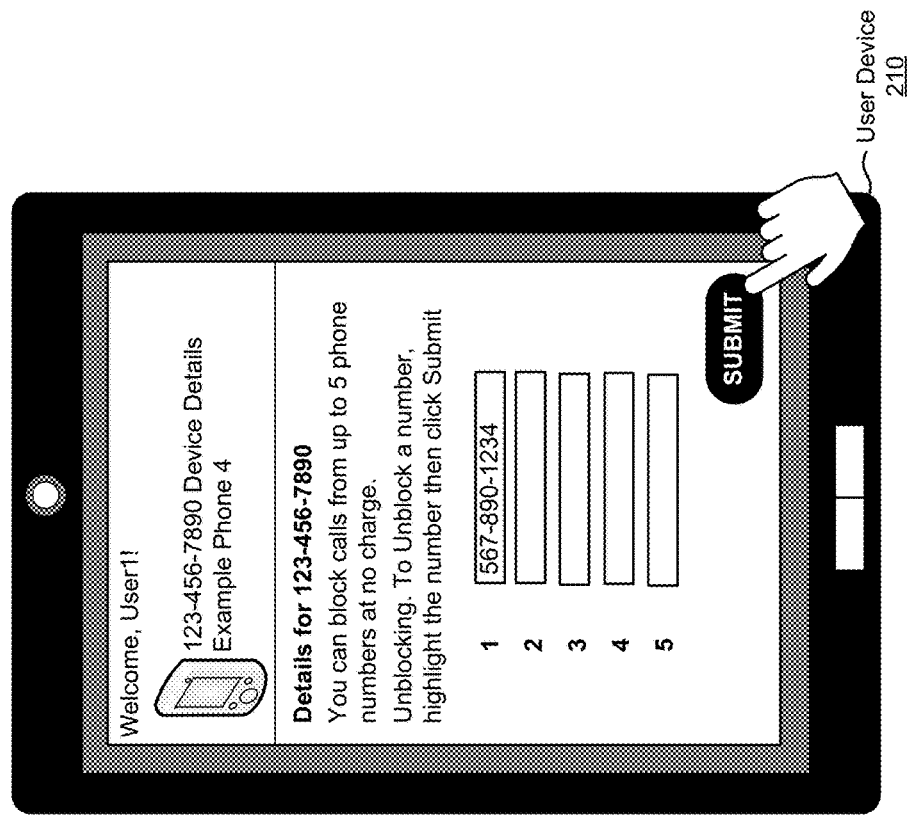

As shown in FIG. 8C, the self-service demonstration may provide one or more input mechanisms for the user to modify a list of blocked numbers. For example, the user may interact with the self-service demonstration to add a number to be blocked, as shown. Assume that after inputting numbers to be blocked, the user proceeds to a next stage of the self-service demonstration by interacting with the "Submit" button.

Figure 8D:
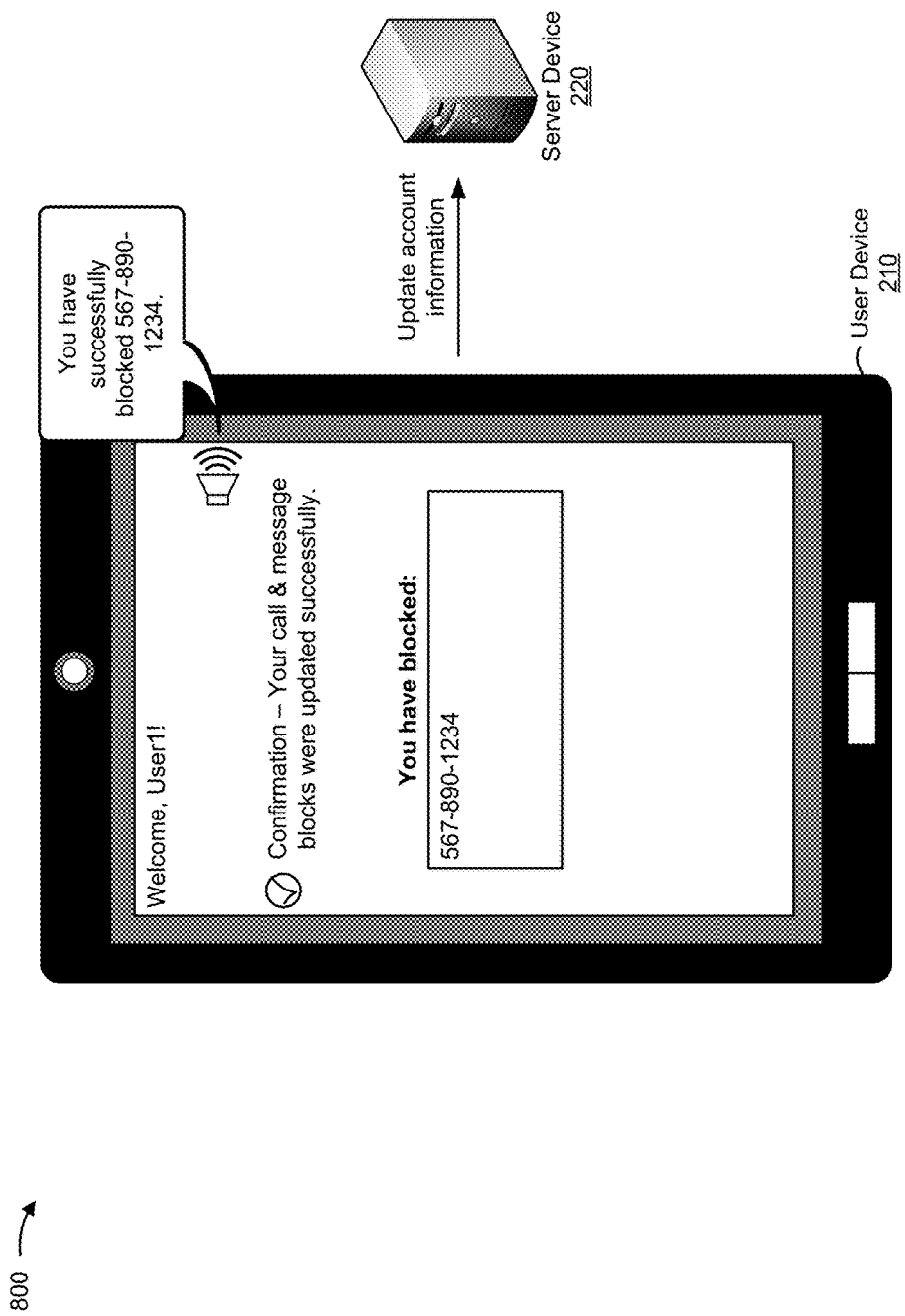

As shown in FIG. 8D, assume that the next stage of the self-service demonstration includes a confirmation screen that indicates that the user's account information has been successfully updated. In this case, assume that user device 210 provides information, that identifies the numbers to be blocked, to server device 220, and that server device 220 adds the numbers to a list of blocked numbers associated with the user's account. In this way, server device 220 may update account information using the self-service demonstration, which may save computing resources as compared to other mechanisms for updating the account information.

As indicated above, FIGS. 8A-8D are provided merely as an example. Other examples are possible and may differ from what was described with regard to FIGS. 8A-8D.

FIGS. 9A-9H are diagrams of an example implementation 900 relating to example process 400 shown in FIG. 4. FIGS. 9A-9H show an example of generating and providing a self-service demonstration to facilitate performance of a self-service task.

Figure 9A:
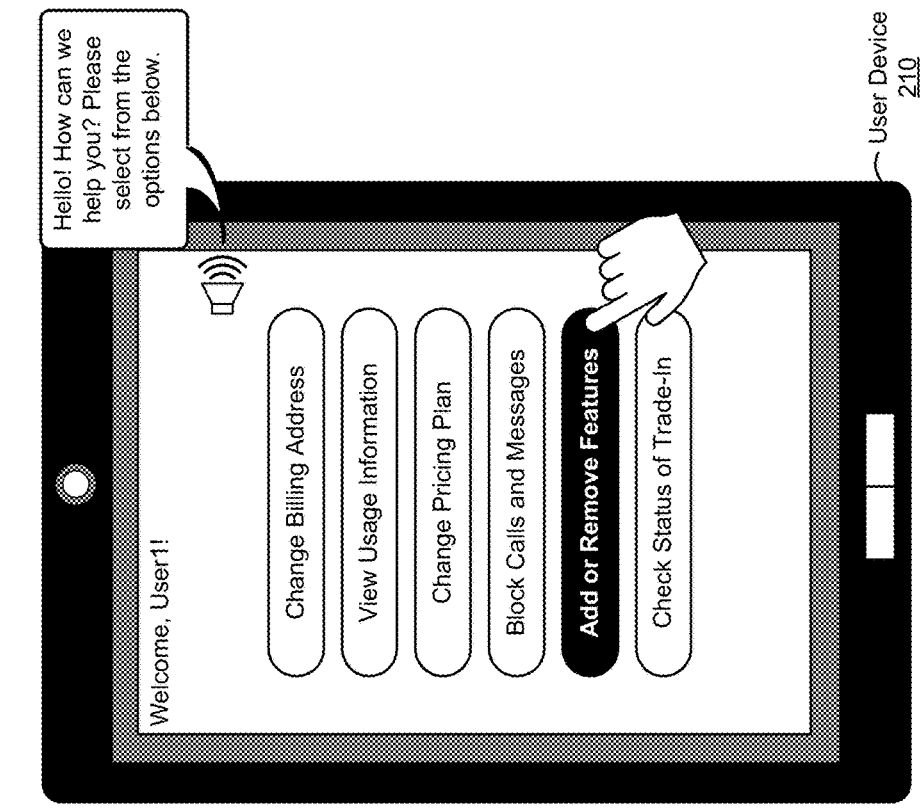
FIGS. 9A-9H are diagrams of an example implementation relating to the example process shown in FIG. 4.

For the purpose of FIGS. 9A-9H, assume that a user interacts with user device 210 to log in to a website that permits the user to perform a self-service task. In this case, assume that the user inputs a user identifier of "User1" to log in to the website. As shown in FIG. 9A, assume that the user selects a self-service task of "Add or Remove Features," which permits the user to interact with a self-service demonstration to add or remove features (e.g., services) associated with a user account of the user.

Figure 9B:
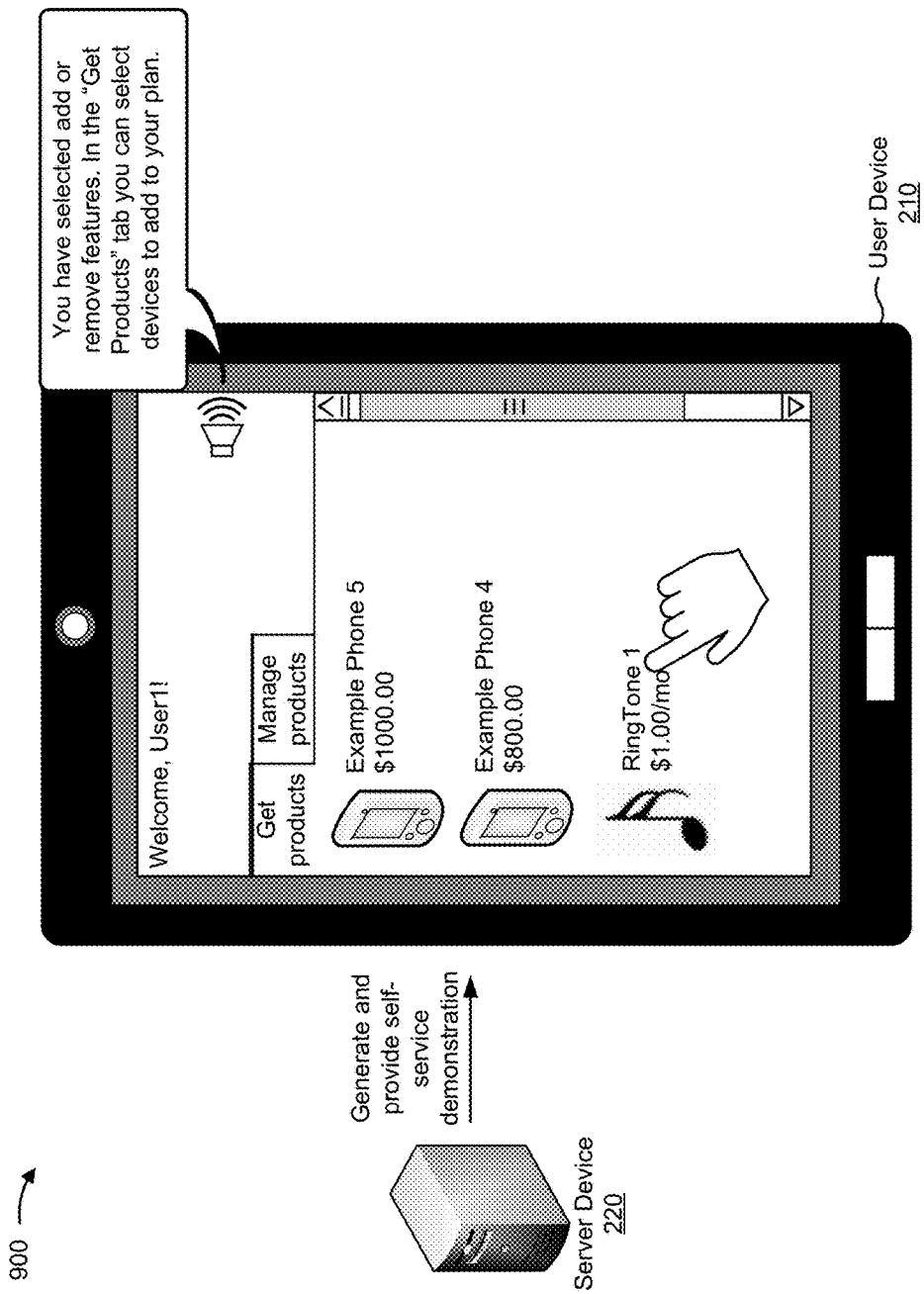

As shown in FIG. 9B, assume that server device 220 generates a self-service demonstration and provides the self-service demonstration to user device 210 for presentation. In this case, the self-service demonstration relates to a self-service task to add or remove features associated with the user's account. Thus, server device 220 uses a data structure (e.g., data structure 505, shown in FIG. 5C) to identify account information types of user device type, mobile service plan, user features, available products, product promotions, available applications, and user payment information, which may be used to generate the self-service demonstration (e.g., as shown by reference number 530 of FIG. 5C). Based on these account information types, server device 220 uses a data structure (e.g., data structure 540, shown in FIG. 5D) to identify a user device type, a mobile service plan, one or more user features, one or more available products, one or more product promotions, one or more available applications, and user payment information associated with a user account of the user. Server device 220 may include this information as part of the self-service demonstration, as shown in FIG. 9B.

As further shown in FIG. 9B, assume that the self-service demonstration includes audio content and visual content that guides the user through adding a feature to the user's account. In this case, the audio content and visual content provided via the self-service demonstration indicate features available to the user, as well instructions for adding the features. As shown, assume that the user selects to add a ringtone to the user's account.

Figure 9C:
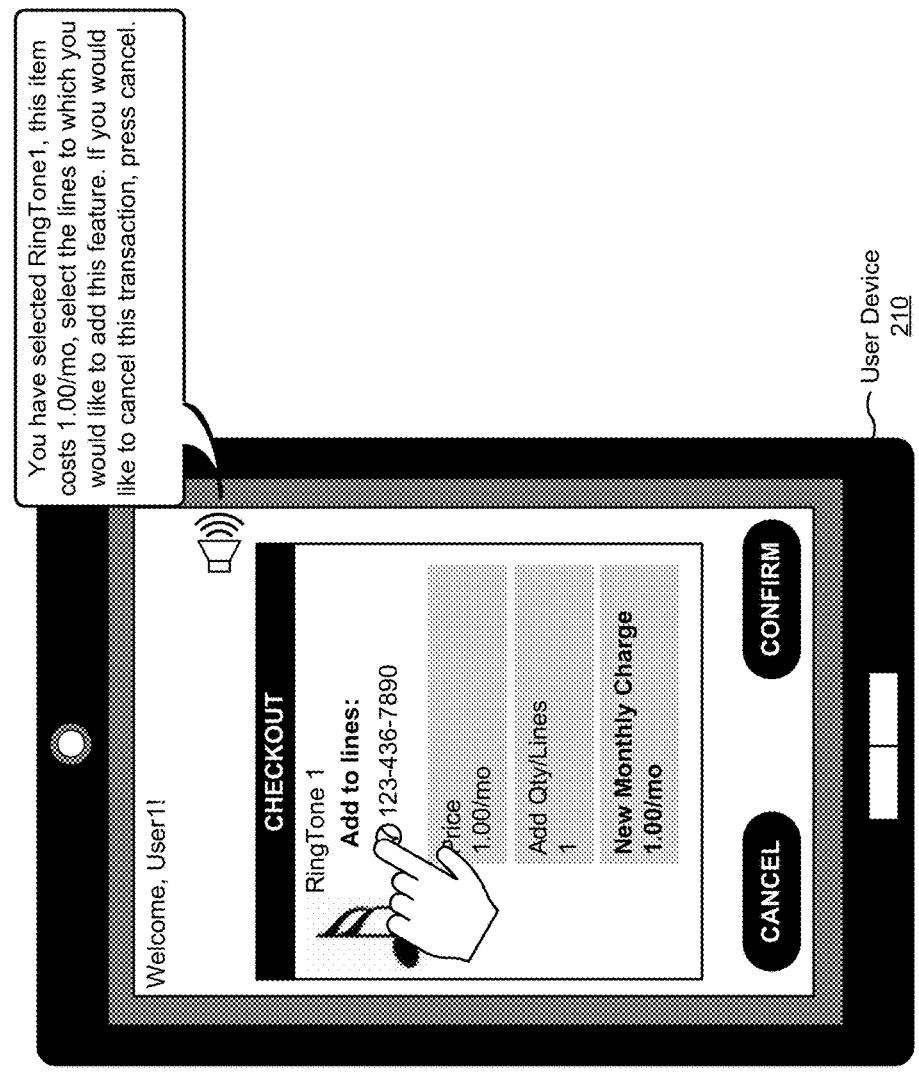

As shown in FIG. 9C, assume that the audio content and the visual content provide an instruction for selecting a phone number for which the feature is to be added. Assume that the user interacts with the self-service demonstration to select the phone number, as shown.

Figure 9D:
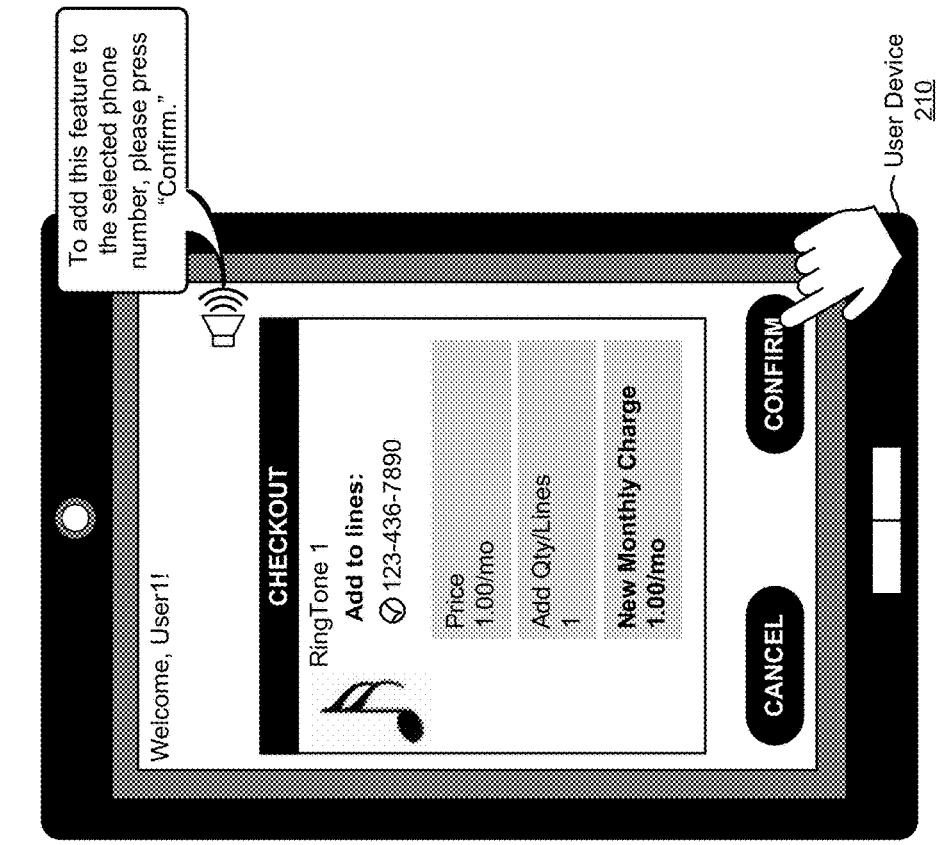

As shown in FIG. 9D, assume that the audio content and the visual content provide an instruction for confirming the addition of the feature to the user's account. Assume that the user confirms the transaction and proceeds to the next stage of the self-service demonstration by interacting with a "Confirm" button.

Figure 9E:
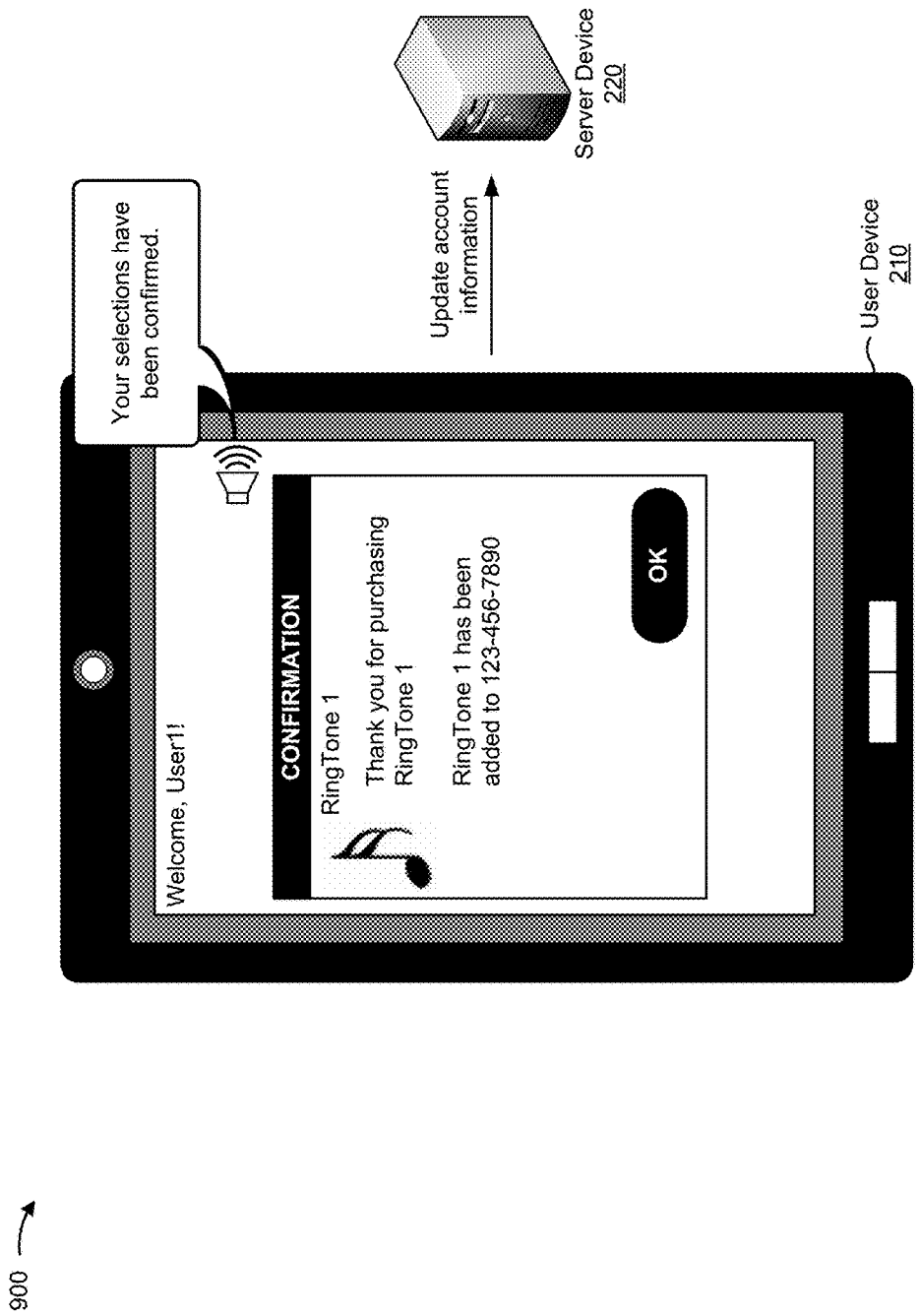

As shown in FIG. 9E, assume that the next stage of the self-service demonstration includes a confirmation screen that indicates that the user's account information has been successfully updated. In this case, assume that user device 210 provides information associated with the new feature to server device 220, and that server device 220 adds the feature to the user's account.

Figure 9F:
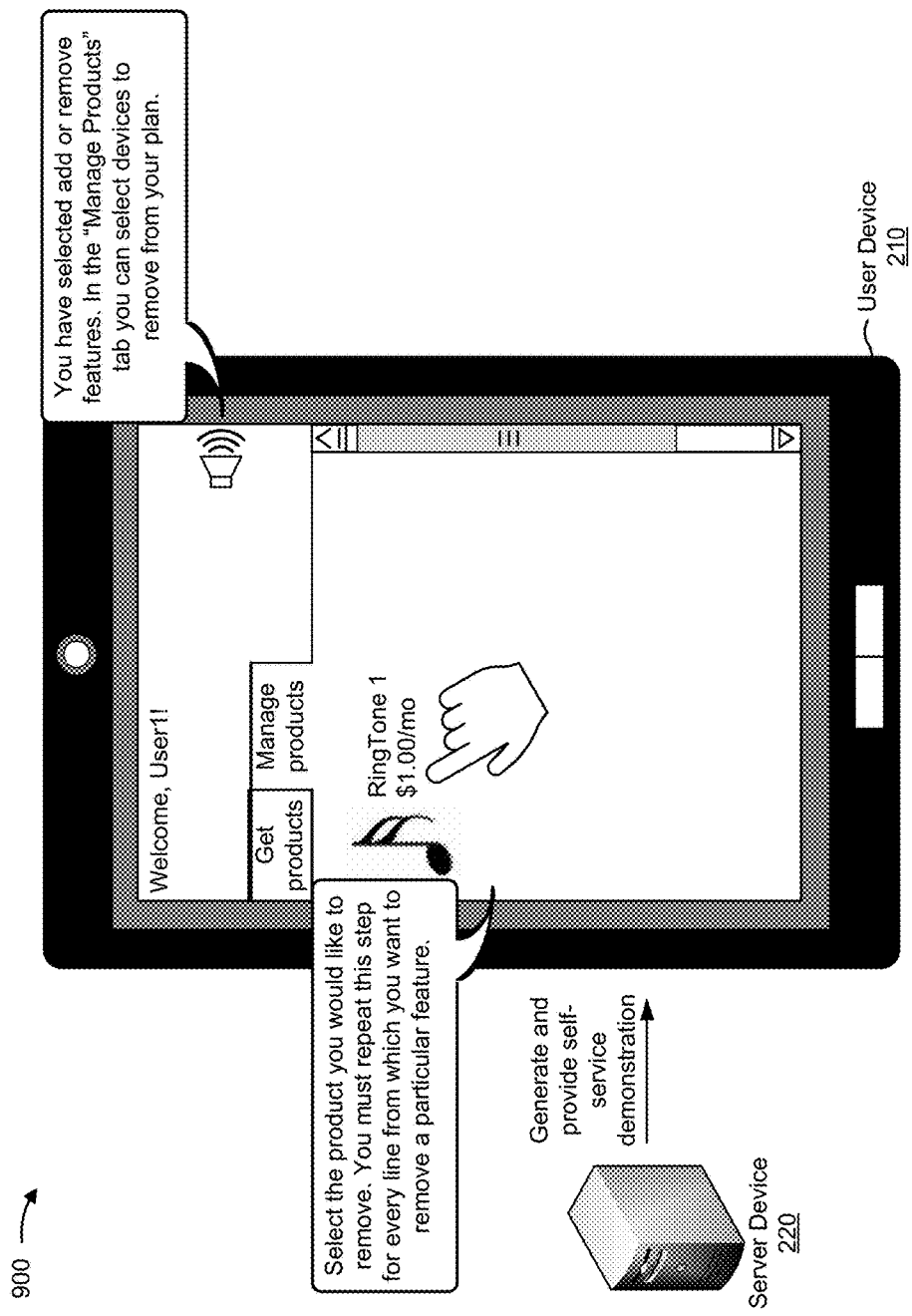

For the purposes of FIG. 9F, assume that at a later time the user wishes to remove the added ringtone from the user's account. As shown in FIG. 9F, assume that the self-service demonstration includes audio content that guides the user through removing a feature from the user's account. In this case, the audio content and visual content provided via the self-service demonstration indicate features on the user's account (e.g., determined based on data structure 505 and/or 540), as well as instructions for removing the features. As shown, assume that the user selects to remove the ringtone from the user's account.

Figure 9G:
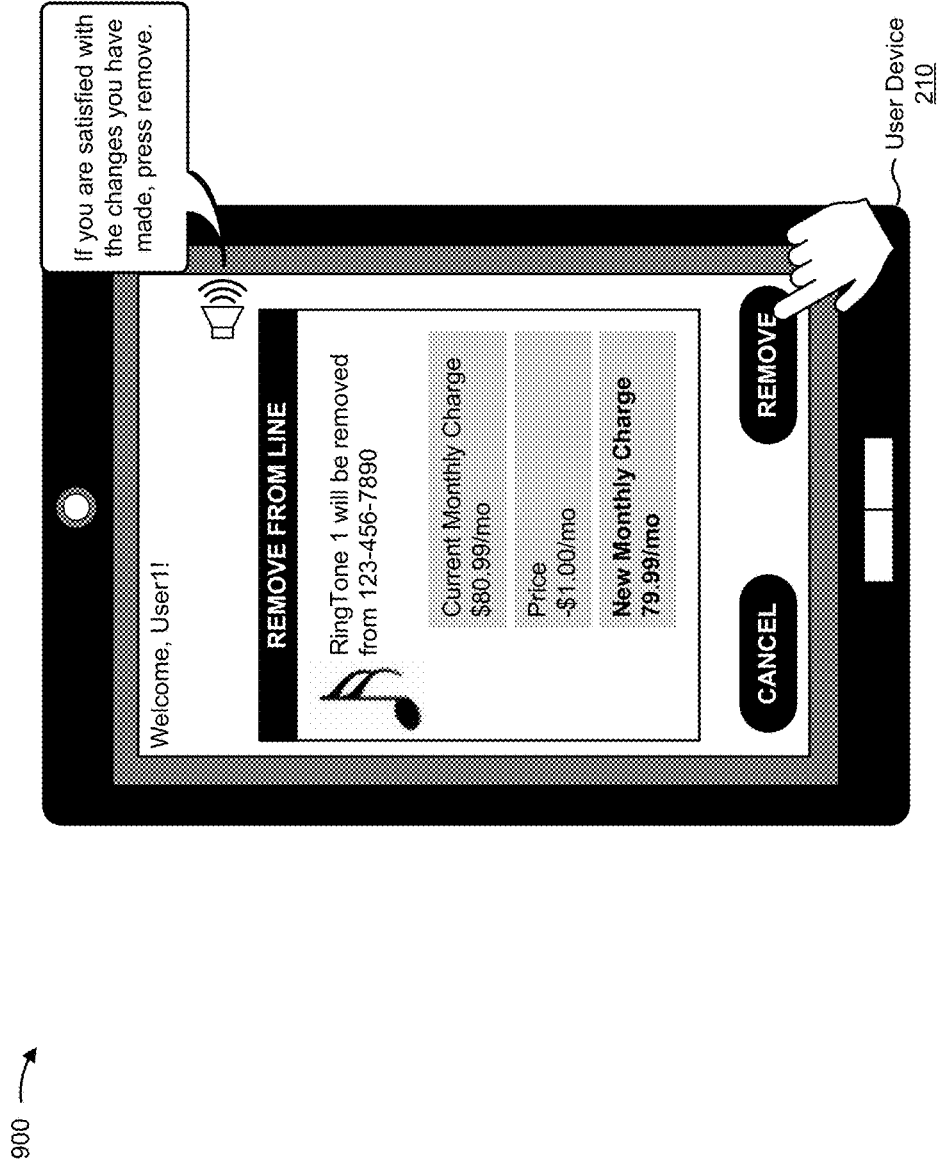

As shown in FIG. 9G, assume that the audio content and the visual content provide an instruction for confirming the removal of the feature from the user's account. Assume that the user confirms the transaction and proceeds to the next stage of the self-service demonstration by interacting with a "Remove" button.

Figure 9H:
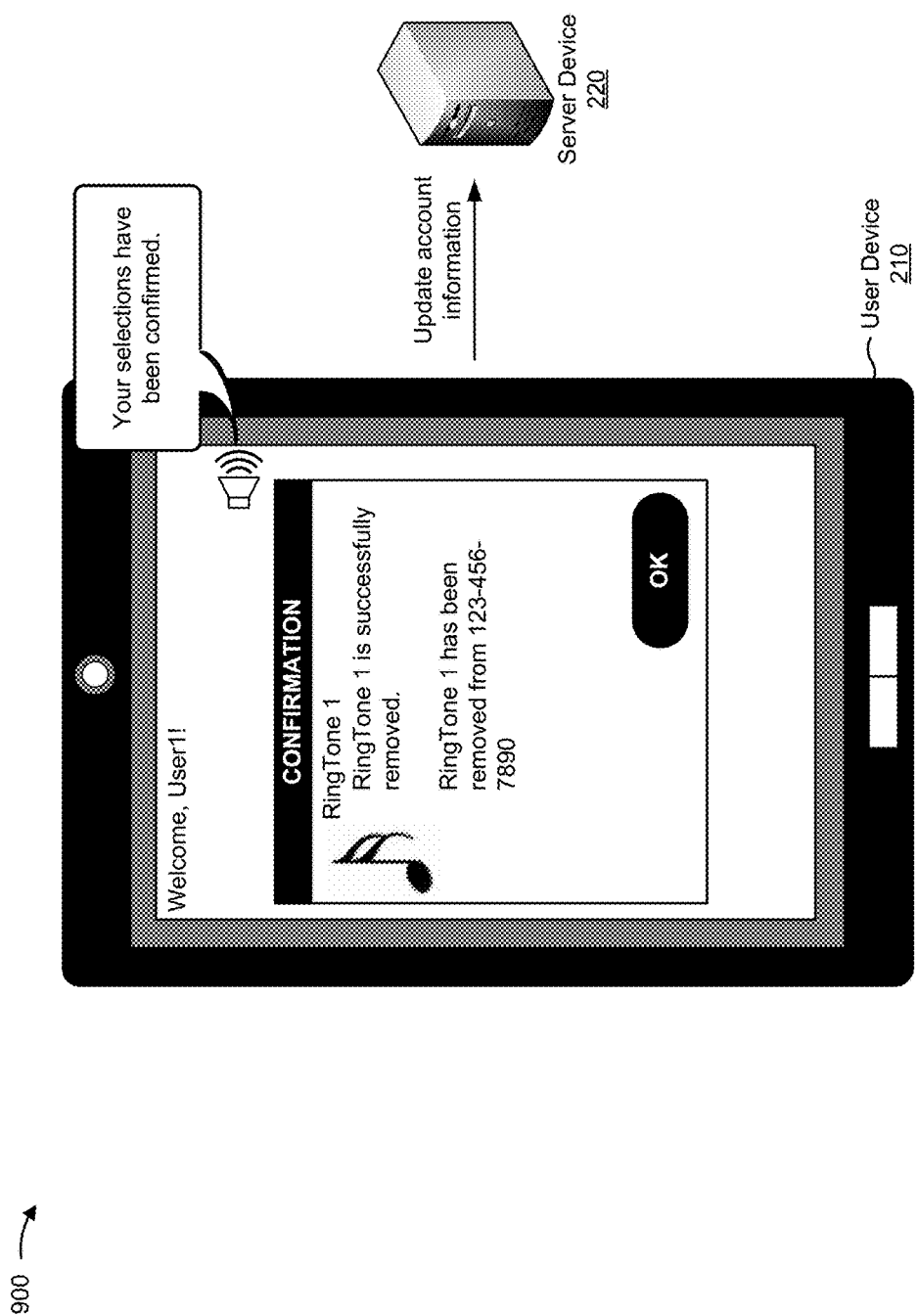

As shown in FIG. 9H, assume that the next stage of the self-service demonstration includes a confirmation screen that indicates that the user's account information has been successfully updated. In this case, assume that user device 210 provides information, that identifies the feature to be removed, to server device 220, and that server device 220 removes the feature from the user's account. In this way, server device 220 may update account information based on user input received from an interaction with the self-service demonstration, which may save computing resources as compared to other mechanisms for updating the account information.

As indicated above, FIGS. 9A-9H are provided merely as an example. Other examples are possible and may differ from what was described with regard to FIGS. 9A-9H.

FIGS. 10A-10D are diagrams of an example implementation 1000 relating to example process 400 shown in FIG. 4. FIGS. 10A-10D show an example of generating and providing a self-service demonstration to facilitate performance of a self-service task.

Figure 10A:
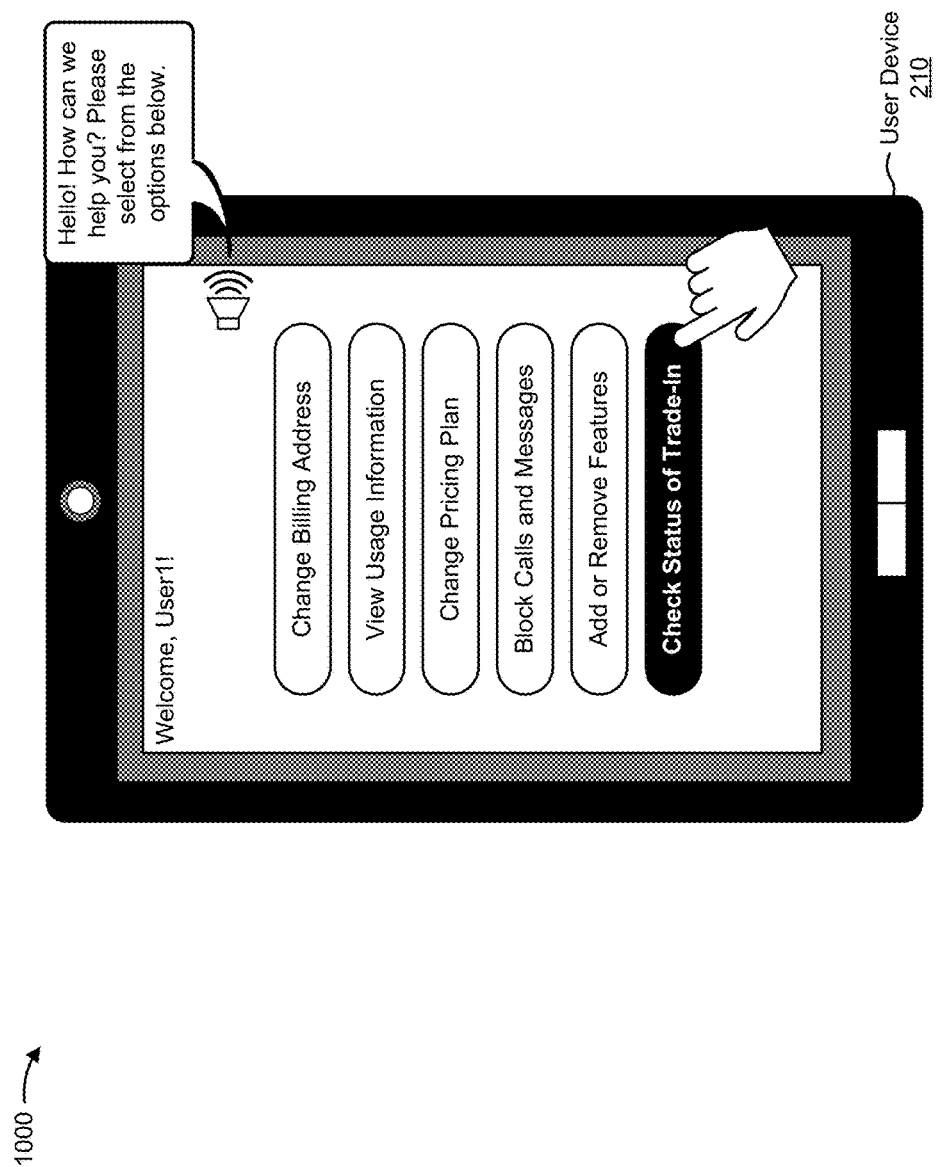
FIGS. 10A-10D are diagrams of an example implementation relating to the example process shown in FIG. 4.

For the purpose of FIGS. 10A-10D, assume that a user interacts with user device 210 to log in to a website that permits the user to perform a self-service task. In this case, assume that the user inputs a user identifier of "User1" to log in to the website. As shown in FIG. 10A, assume that the user selects a self-service task of "Check Status of Trade-in," which permits the user to interact with a self-service demonstration to check the status of a device trade-in associated with a user account of the user.

Figure 10B:
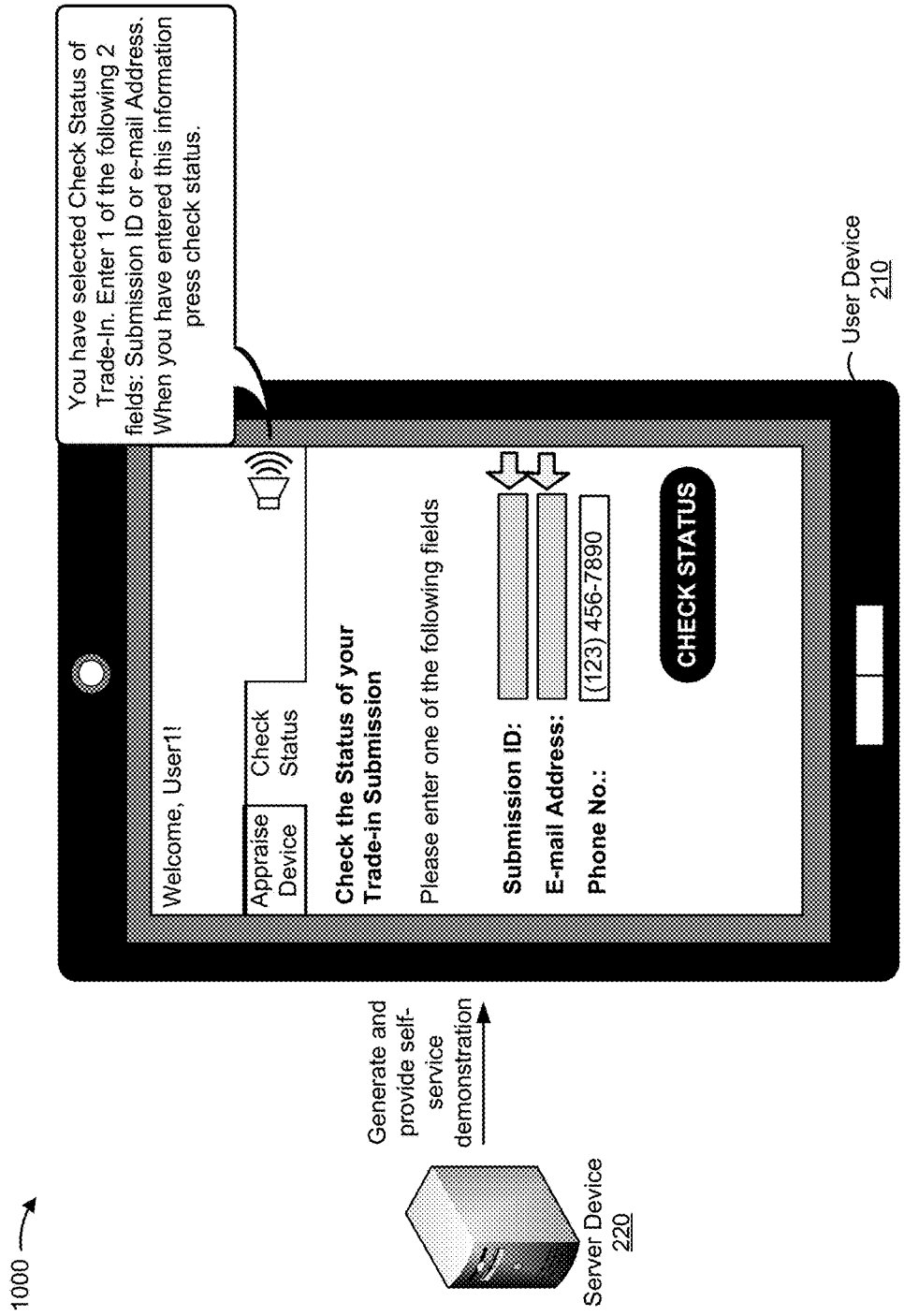

As shown in FIG. 10B, assume that server device 220 generates a self-service demonstration and provides the self-service demonstration to user device 210 for presentation. In this case, the self-service demonstration relates to a self-service task to check the status of a device trade-in. Thus, server device 220 uses a data structure (e.g., data structure 505, shown in FIG. 5C) to identify account information types of user device type and phone number, which may be used to generate the self-service demonstration (e.g., as shown by reference number 535 of FIG. 5C). Based on these account information types, server device 220 uses a data structure (e.g., data structure 540, shown in FIG. 5D) to identify a user device type and a phone number associated with a user account of the user. Server device 220 may include this information as part of the self-service demonstration, as shown in FIG. 10B.

As further shown in FIG. 10B, assume that the self-service demonstration includes audio content and visual content that guides the user through checking a status of the user's trade-in. In this case, the audio content and visual content provided via the self-service demonstration indicate the user's phone number for checking the status of the user's trade-in, as well as instructions for checking the status of the user's trade-in.

Figure 10C:
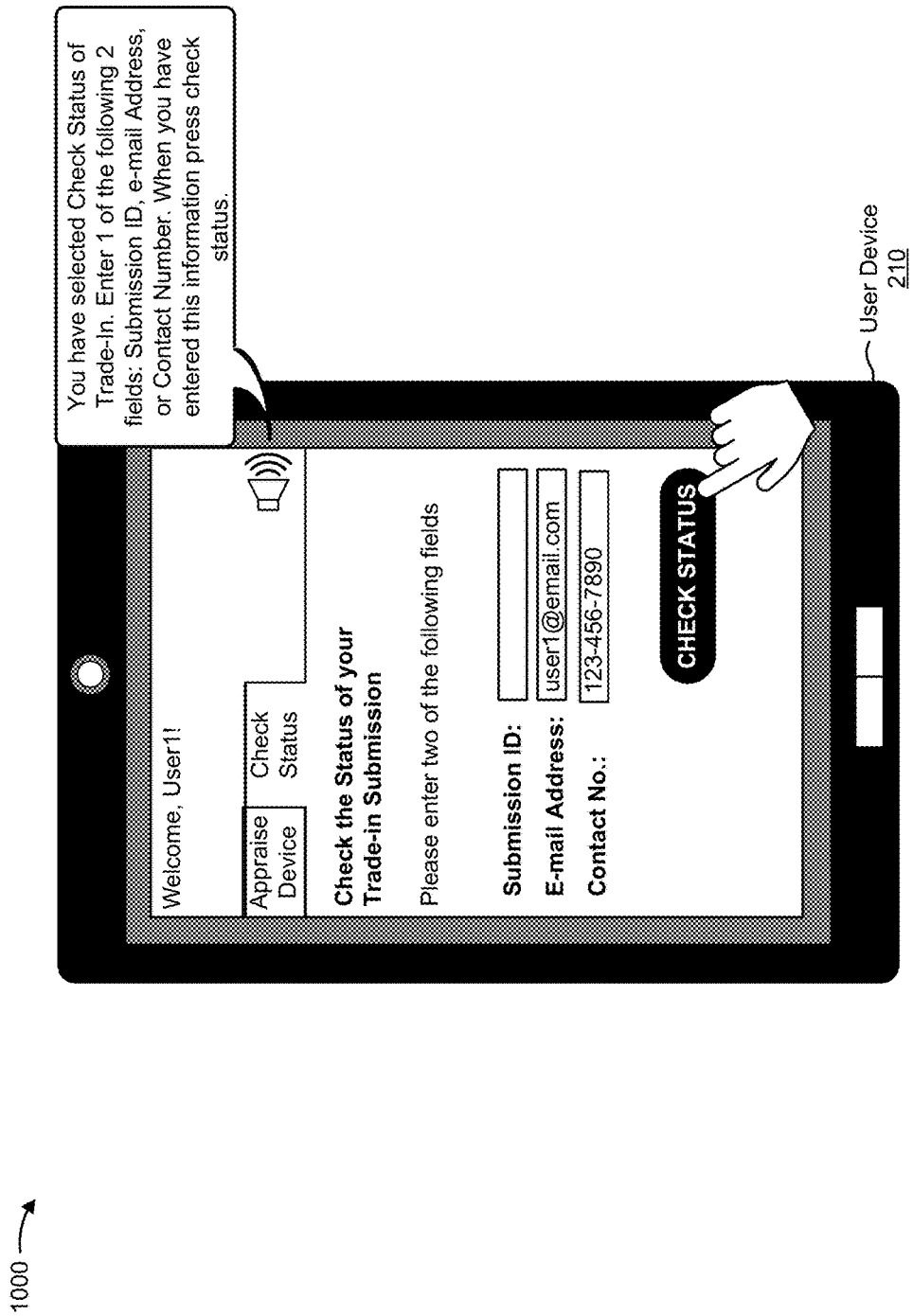

As shown in FIG. 10C, the self-service demonstration may provide input mechanisms for the user to check the status of the trade-in. For example, the user may interact with the self-service demonstration to input an e-mail address to check the status of the user's trade-in. Assume that after inputting the user's email address, the user proceeds to a next stage of the self-service demonstration by interacting with the "Check Status" button.

Figure 10D:
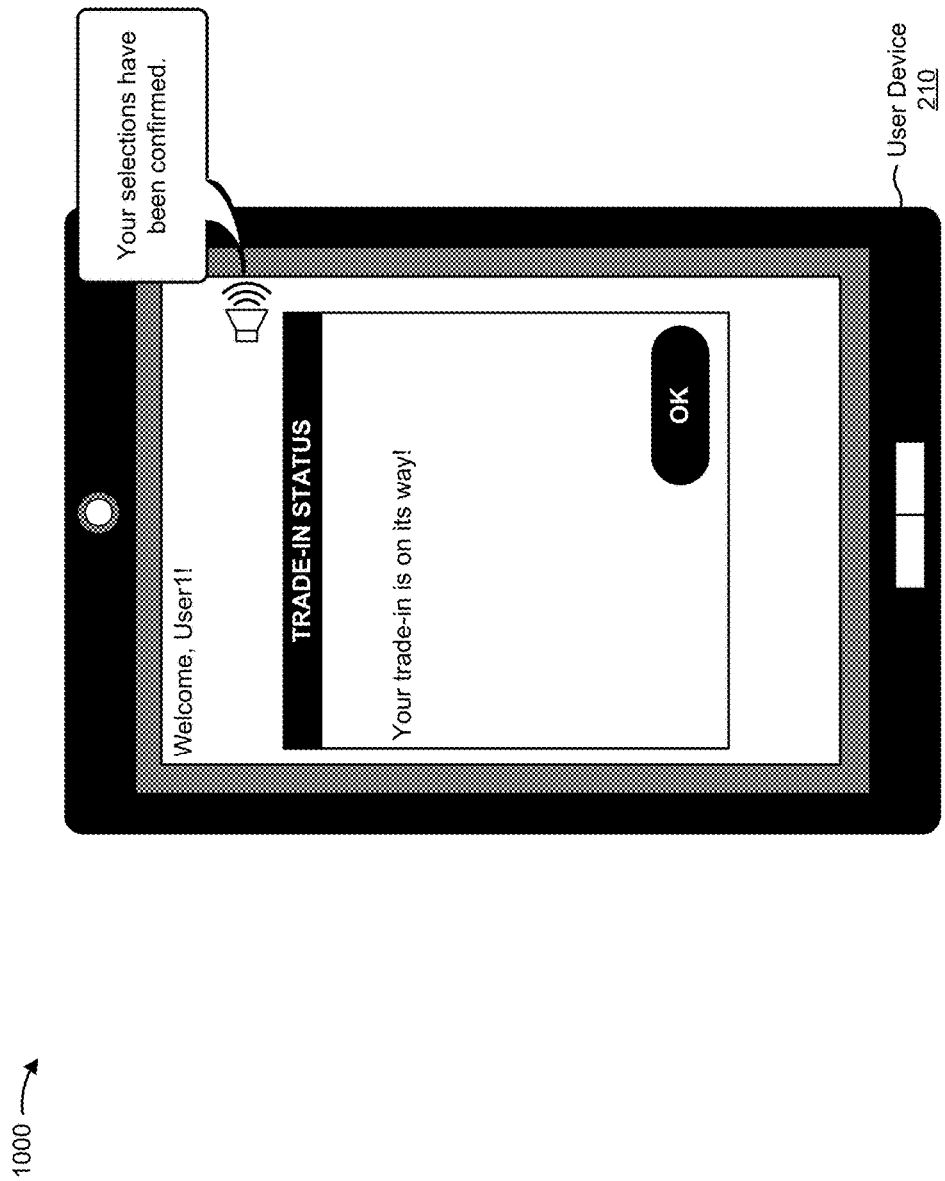

As shown in FIG. 10D, the self-service demonstration may provide information that identifies a status of the user's trade-in. In this way, the user may view and/or update account information using the self-service demonstration, which may save time and/or computing resources as compared to other mechanisms for viewing and/or updating the account information.

As indicated above, FIGS. 10A-10D are provided merely as an example. Other examples are possible and may differ from what was described with regard to FIGS. 10A-10D.

Implementations described herein assist in generating and creating a self-service demonstration that uses account information, associated with the user, as part of the instructions to explain how to perform the self-service task, and that permits the user to interact directly with the self-service demonstration to perform the self-service task.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, and/or a combination of hardware and software.

Certain user interfaces have been described herein and/or shown in the figures. A user interface may include a graphical user interface, a non-graphical user interface, a text-based user interface, etc. A user interface may provide information for display. In some implementations, a user may interact with the information, such as by providing input via an input component of a device that provides the user interface for display. In some implementations, a user interface may be configurable by a device and/or a user (e.g., a user may change the size of the user interface, information provided via the user interface, a position of information provided via the user interface, etc.). Additionally, or alternatively, a user interface may be pre-configured to a standard configuration, a specific configuration based on a type of device on which the user interface is displayed, and/or a set of configurations based on capabilities and/or specifications associated with a device on which the user interface is displayed.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "group" and "set" are intended to include one or more items (e.g., related items, unrelated items, a combination of related items and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A device, comprising:
one or more memories; and
one or more processors, communicatively coupled to the one or more memories, to:
provide a user interface to a user device,
the user interface being provided by executing an application;
obtain a user identifier associated with a user of the user device,
the user identifier being obtained via the user interface;
provide, via the user interface, a list of self-service tasks that the user may perform via a web self-service;
identify a self-service task from the list of the self-service tasks to be performed by the user using the user device,
the self-service task being a task that does not require the user to interact with another person,
the self-service task being identified by the user selecting the self-service task via the user interface,
the self-service task to be performed via an input mechanism,
information identifying the self-service tasks being stored in a data structure of the device,
the data structure of the device associating the self-service tasks with one or more types of account information;
obtain account information, specific to the user, based on the user identifier and the self-service task;
identify a code template based on the self-service task;
generate code for a self-service demonstration using the code template that includes:
first code for instructions for performing the self-service task,
second code for media content for communicating the instructions,
the media content including at least one of:
video content,
audio content,
textual content, or
graphical content, and third code for providing the account information specific to the user,
the media content being based on the account information specific to the user;
execute the code for the self-service demonstration for presentation to the user via the user interface,
the self-service demonstration and the self-service task being provided via a single user interface without leaving a flow of the instructions provided in the self-service demonstration,
the single user interface including at least one of audio or visual content provided via the self-service demonstration to guide the user through the self-service task,
the at least one of the audio or visual content being provided via the self-service demonstration upon execution of the code, and
the self-service demonstration including a plurality of stages,
each stage of the plurality of stages requiring user input prior to moving to a next stage;
receive an indication of an interaction, by the user, with the self-service demonstration,
the interaction with the self-service demonstration including the user input to perform the self-service task via the input mechanism; and
modify the account information based on the user input.

2. The device of claim 1, where the one or more processors, when obtaining the account information, are further to:
determine a self-service task identifier that identifies a type of the self-service task;
determine, based on the self-service task identifier, a type of account information associated with the self-service task; and
obtain the account information based on the user identifier and the type of account information.

3. The device of claim 1, where the self-service demonstration includes a video that includes the account information.

4. The device of claim 1, where the code template includes:
the code for generating the self-service demonstration; and
a code insertion indicator that indicates a location, in the code, where the account information is to be inserted.

5. The device of claim 1, where the one or more processors, when generating the self-service demonstration based upon the code template, are further configured to:
identify the code template based on the self-service task, the code template including:
the code for generating the self-service demonstration, and
a code insertion indicator that indicates a location, in the code, where the account information is to be inserted; and
insert the account information in the location in the code indicated by the code insertion indicator.

6. The device of claim 1,
where the one or more processors, when providing the self-service demonstration, are further configured to:
provide the code for the self-service demonstration to the user device.

7. The device of claim 1, where the one or more processors, when modifying the account information, are further configured to:
add information to a user account of the user;
remove information from the user account; or
modify information in the user account.

8. A non-transitory computer-readable medium storing instructions, the instructions comprising:
one or more instructions that, when executed by one or more processors, cause the one or more processors to:
provide a user interface to a user device,
the user interface being provided by executing an application;
determine a user identifier associated with a user of the user device who is to perform a self-service task,
the self-service task being a task that does not require the user to interact with another person,
the user identifier being obtained via the user interface;
provide, via the user interface, a list of self-service tasks that the user may perform via a web self-service;
identify the self-service task of the list of the self-service tasks to be performed by the user,
the self-service task being identified by the user selecting the self-service task via the user interface,
the self-service task to be performed via an input mechanism,
information associated with the self-service tasks being stored in a data structure of a device,
the data structure of the device associating the self-service tasks with one or more types of account information;
obtain account information, associated with the user, based on the user identifier and the self-service task;
identify a code template based on the self-service task;
generate code, for a self-service demonstration, using the code template that includes:
first code for an instruction for performing the self-service task,
second code for media content that communicates the instruction, and
third code for providing the account information associated with the user;
execute the code for the self-service demonstration for presentation to the user via the user interface,
the self-service demonstration and the self-service task being provided via a single user interface without leaving a flow of the instructions provided in the self-service demonstration,
the single user interface including at least one of audio or visual content provided via the self-service demonstration to guide the user through the self-service task,
the at least one of the audio or visual content being provided via the self-service demonstration upon execution of the code, and
the self-service demonstration including a plurality of stages,
each stage of the plurality of stages requiring user input prior to moving to a next stage;
receive an indication of an interaction, by the user, with the self-service demonstration,
the interaction with the self-service demonstration including the user input to perform the self-service task via the input mechanism; and
modify the account information based on the user input to perform the self-service task.

9. The non-transitory computer-readable medium of claim 8, where the one or more instructions, that cause the one or more processors to obtain the account information, further cause the one or more processors to:

determine a type of account information associated with the self-service task; and obtain the account information based on the type of account information.

10. The non-transitory computer-readable medium of claim 8, where the self-service demonstration includes audio that includes the account information.

11. The non-transitory computer-readable medium of claim 8, where the one or more instructions, that cause the one or more processors to generate the code for the self-service demonstration based upon the code template, further cause the one or more processors to:

identify the code template based on the self-service task, the code template including a code insertion indicator that indicates a location, in the code, where the account information is to be inserted;

insert the account information in the location in the code indicated by the code insertion indicator; and generate the code for the self-service demonstration based on inserting the account information in the location in the code.

12. The non-transitory computer-readable medium of claim 8, where the one or more instructions, when executed by the one or more processors, further cause the one or more processors to:

identify modified account information based on modifying the account information; and store the modified account information to complete performance of the self-service task.

13. The non-transitory computer-readable medium of claim 8, where the one or more instructions, that cause the one or more processors to modify the account information, further cause the one or more processors to:

add information to a user account of the user;

remove information from the user account; or modify information in the user account.

14. The non-transitory computer-readable medium of claim 8, where the self-service task includes at least one of:

changing personal information stored in a user account of the user; or modifying a service associated with the user account.

15. A method, comprising:

providing, by a device, a user interface to a user device, the user interface being provided by executing an application;

determining, by the device, a user identifier associated with a user of the user device who is to perform a self-service task,
the self-service task being a task that does not require the user to interact with another person,
the user identifier being obtained via the user interface;

providing, by the device and via the user interface, a list of self-service tasks that the user may perform via a web self-service;

identifying, by the device, a self-service task identifier that identifies the self-service task of the list of the self-service tasks to be performed by the user,
the self-service task being identified by the user selecting the self-service task via the user interface,
the self-service task to be performed via an input mechanism,
information associated with the self-service tasks being stored in a data structure of the device,
the data structure of the device associating the self-service tasks with one or more types of account information;

obtaining, by the device and based on the self-service task identifier and the user identifier, account information associated with a user account of the user;

generating, by the device, code for a self-service demonstration that includes:
first code for providing the account information associated with the user,
second code for directions for performing the self-service task, and
third code for media content for communicating the directions;

executing, by the device, the code for the self-service demonstration for presentation to the user device via the user interface,
the self-service demonstration and the self-service task being provided via a single user interface without leaving a flow of instructions provided in the self-service demonstration,
the single user interface including at least one of audio or visual content provided via the self-service demonstration to guide the user through the self-service task,
the at least one of the audio or visual content being provided via the self-service demonstration upon execution of the code, and
the self-service demonstration including a plurality of stages,
each stage of the plurality of stages requiring user input prior to moving to a next stage;

receiving, by the device, an indication of an interaction, by the user, with the self-service demonstration,
the interaction with the self-service demonstration including the user input to perform the self-service task via the input mechanism; and modifying, by the device, the user account based on the user input.

16. The method of claim 15, where obtaining the account information further comprises:

identifying a type of account information based on the self-service task identifier;

identifying the user account based on the user identifier; and obtaining the account information, of the type of account information, based on the user account.

17. The method of claim 15, where generating the code further comprises:

identifying a code template based on the self-service task identifier,
the code template including:
the code for the self-service demonstration, and
a code insertion indicator that indicates a location, in the code, where the account information is to be inserted;

inserting the account information in the location in the code indicated by the code insertion indicator; and generating the code for the self-service demonstration based on inserting the account information in the location in the code.

18. The method of claim 15, where modifying the user account comprises at least one of:

adding information to the user account;

removing information from the user account; or modifying information in the user account.

19. The method of claim 15, where providing the code for the self-service demonstration further comprises:

providing the code to the user device, associated with the user, for presentation to the user; and where receiving the indication of the interaction with the self-service demonstration further comprises:
receiving the indication of the interaction from the user device based on providing the code to the user device.

20. The method of claim 15, where the self-service task includes at least one of:
changing personal information stored in the user account; or
modifying a service associated with the user account.

* * * * *